(12) United States Patent
Hatton et al.

(10) Patent No.: US 7,598,199 B2
(45) Date of Patent: Oct. 6, 2009

(54) CATALYTIC NANOPARTICLES FOR NERVE-AGENT DESTRUCTION

(75) Inventors: T. Alan Hatton, Sudbury, MA (US); Lev E. Bromberg, Swampscott, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 613 days.

(21) Appl. No.: 11/126,064

(22) Filed: May 10, 2005

(65) Prior Publication Data

US 2009/0218543 A1   Sep. 3, 2009

(51) Int. Cl.
*B01J 21/00* (2006.01)
*B01J 23/00* (2006.01)
*B01J 25/00* (2006.01)
*B01J 29/00* (2006.01)
*B01J 31/00* (2006.01)

(52) U.S. Cl. .................. 502/150; 502/100; 502/159; 502/162; 502/164

(58) Field of Classification Search .............. 502/150, 502/100, 159, 162, 164
See application file for complete search history.

(56) References Cited

U.S. PATENT DOCUMENTS

| | | | |
|---|---|---|---|
| 4,094,804 A | 6/1978 | Shimoiizaka et al. | |
| 4,929,589 A | 5/1990 | Martin et al. | |
| 5,397,476 A * | 3/1995 | Bradbury et al. | 210/675 |
| 2002/0000398 A1* | 1/2002 | Skold | 209/214 |
| 2003/0054949 A1 | 3/2003 | Chang et al. | |
| 2003/0087435 A1* | 5/2003 | Brandt | 435/451 |
| 2004/0005681 A1* | 1/2004 | Gordon et al. | 435/175 |
| 2004/0009614 A1* | 1/2004 | Ahn et al. | 436/526 |
| 2004/0253181 A1 | 12/2004 | Port et al. | |

FOREIGN PATENT DOCUMENTS

| | | |
|---|---|---|
| DE | 19516323 A1 | 11/1996 |
| EP | 1086739 A2 | 3/2001 |
| EP | 1486463 A2 | 12/2004 |
| JP | 2004359726 | 12/2004 |
| WO | WO-03/092656 A1 | 11/2003 |
| WO | WO-2005/013897 A2 | 2/2005 |

OTHER PUBLICATIONS

Aglietto, M. et al. "Synthesis and catalytic activity of optically active polymers containing oxime groups," *Polymer* 1980, 21, 541-544.
Amos, D.; Leake, B. "Clean-up of chemical agents on soils using simple washing or chemical treatment processes," *J. Hazard. Mater.* 1994, 39, 107-17.
Bhattacharya, S.; Snehalatha, K. "Evidence for the Formation of Acylated or Phosphorylated Monoperoxyphthalates in the Catalytic Esterolytic Reactions in Cationic Surfactant Aggregates," *J. Org. Chem.* 1997, 62(7), 2198-2204.
Bica, D. "Preparation of Magnetic Fluids for Various Applications," *Romanian Rep. Phys.* 1995, 47, 265-272.

Bolton, S.; Beckett, A. "Metal chelates as potential reactivators of organic phosphate poisoned acetylcholinesterase," *J. Pharm. Sci.* 1964, 53, 55-60.
Breslow, R.; Chipman, D. "Mixed Metal Complexes as Enzyme Models. I. Intracomplex Nucleophilic Catalysis by an Oxide Anion," *J. Am. Chem. Soc.* 1965, 87(18), 4195-4196.
Bucak, S. et al. "Protein Separations Using Colloidal Magnetic Particles," *Biotechnol. Prog.* 2003, 19, 477-484.
Buncel, E.; Cannes, C.; Chatrousse, A.-P.; Terrier, F. "Reactions of Oximate α- Nucleophiles with Esters: Evidence from Solvation Effects for Substantial Decoupling of Desolvation and Bond Formation," *J. Am. Chem. Soc.* 2002, 124(30), 8766-8767.
Castelvetro, V.; De Vita, C. "Nanostructured hybrid materials from aqueous polymer dispersions," *Adv. Colloid Interface Sci.* 2004, 108/109, 167-185.
Chen, W.; Boven, G.; Challa, G. Studies on immobilized polymer-bound imidazole-copper(II) complexes as catalysts. 3. Immobilization of copper(II) complexes of poly(styrene-co-N-vinylimidazole) by grafting on silica and their catalysis of oxidative coupling of 2,6-disubstituted.
Chiron, S. et al. "Pesticide chemical oxidation: state-of-the-art," *Water Research* 2000, 34(2), 366-377.
Courtney, R. C. et al. "Metal Chelate Compounds as Catalysts in the Hydrolysis of Isopropyl Methylphosphonofluoridate and Diisopropylphosphorofluoridate," *J. Am. Chem. Soc.* 1957, 79(12), 3030-3036.
DeCuyper, M. et al., "Catalytic durability of magnetoproteoliposomes captured by high-gradient magnetic forces in a miniature fixed-bed reactor," *Biotechnol. Bioeng.* 1996, 49, 654-658.
Elsner, M.; Schwarzenbach, R. P.; Kellerhals, T.; Luzi, S.; Zwank, L.; Angst, W.; Haderlein, S. B. "Mechanisms and Products of Surface-Mediated Reductive Dehalogenation of Carbon Tetrachloride by Fe(II) on Goethite," *Environ. Sci. Technol.* 2004, 38(7), 2058-2066.

(Continued)

*Primary Examiner*—Michael A Marcheschi
*Assistant Examiner*—James E McDonough
(74) *Attorney, Agent, or Firm*—Dana M. Gordon; Foley Hoag LLP

(57) ABSTRACT

The present invention relates to compositions and methods for sorbing (e.g., adsorption and chemisorption) and destroying organophosphate chemical agents. In certain embodiments, the invention contemplates the use of finely divided, modified nanoscale metal oxide particles. In one embodiment, a suspension of magnetite ($Fe_3O_4$) nanoparticles modified with 2-pralidoxime or its polymeric analog, poly(4-vinylpyridine-N-phenacyloxime-co-acrylic acid), catalyzes the hydrolysis of organophosphate compounds at a neutral pH. The oxime-modified magnetite particles serve as a nano-sized particulate carrier with a powerful α-nucleophile, an oximate group, immobilized on its surface. The oxime-modified magnetite nanoparticles are colloidally stable at neutral pH and they are readily recovered from the aqueous milieu by high-gradient magnetic separation methods.

19 Claims, 9 Drawing Sheets

OTHER PUBLICATIONS

Eriksson, S.; Nylén, U.; Rojas, S.; Boutonnet, M. "Preparation of catalysts from microemulsions and their applications in heterogeneous catalysis," *Applied Catalysis A: General* 2004, 265(2), 207-219.

Eyer, P. "The role of oximes in the management of organophosphorus pesticide poisoning," *Toxicol Rev.* 2003, 22(3), 165-190.

Fanti, M.; Mancin, F.; Tecilla, P.; Tonellato, U. "Ester Cleavage Catalysis in Reversed Micelles by Cu(II) Complexes of Hydroxy-Functionalized Ligands," *Langmuir* 2000, 16(26), 10115-10122.

Feltin, N.; Pileni, M. P. "New Technique for Synthesizing Iron Ferrite Magnetic Nanosized Particles," *Langmuir* 1997, 13, 3927-3933.

Gagliano, R. A.; Knowlton, R. C.; Byers, L. D. "Methylimidazole-catalyzed ester hydrolysis: nonlinear kinetics," *J. Org. Chem.* 1989, 54(22), 5247-5250.

Gustafson, R. L.; Chaberek, S. C., Jr.; Martell, A. E. "A Kinetic Study of the Copper(II) Chelate Catalyzed Hydrolysis of Diisopropyl Phosphorofluroidate," *J. Am. Chem. Soc.* 1963, 85, 598-601.

Hammond, P. S.; Forster, J. S. "A polymeric amine-copper (II) complex as catalyst for the hydrolysis of 1,2,2-trimethylpropyl methylphosphonofluoridate (Soman) and bis(1-methylethyl)phosphorofluoridate (DFP)," *J. Appl. Polym. Sci.* 1991, 43, 1925-1931.

Hanania, G. I. H. et al. "Reduction potentials of complex ions. The tris(pyridine-2-aldoxime)iron(III)-tris(pyridine-2-aldoxime)iron(II) system" *J. Phys. Chem.* 1968, 72(4), 1355-1361.

Hanania, G. I. H. et al. "Reduction Potentials of Complex Ions. The Bis(2,6-pyridinedialdoxime)iron(III-II) System," *J. Phys. Chem.* 1977, 81(14), 1382-1387.

Holstege, C. P.; Dobmeier, S. G. "Nerve Agent Toxicity and Treatment," *Curr. Treat. Options Neurol.* 2005, 7(2), 91-98.

Hubbuch, J. J. et al. "High-Gradient Magnetic Affinity Separation of Trypsin from Porcine Pancreatin," *Biotechnol. Bioeng.* 2002, 79, 301-313.

Jandorf, B. J. "Chemical Reactions of Nerve Gases in Neutral Solution. I. Reactions with Hydroxylamine," *J. Am. Chem. Soc.* 1956, 78(15), 3686-3691.

Khng, H. P. et al. "The Synthesis of Sub-Micron Magnetic Particles and Their Use for Preparative Purification of Proteins," *Biotechnol. Bioeng.* 1998, 60, 419-424.

Kim, D. K. et al. "Protective Coating of Superparamagnetic Iron Oxide Nanoparticles," *Chem. Mater.* 2003, 15(8), 1617-1627.

Kitano, H.; Sun, Z.; Ise, N. "Desolvation effects in the esterolysis catalyzed by imidazole-containing polymers," *Macromolecules* 1983, 16(12), 1823-1827.

Kovach, I. M.; Bennet, A. J.; Bibbs, J. A.; Zhao, Q. "Nucleophilic and protolytic catalysis of phosphonate hydrolysis: isotope effects and activation parameters," *J. Am. Chem. Soc.* 1993, 115(12), 5138-5144.

Krause, R. A.; Busch, D. H. "The Complexes of Nickel(II), Palladium(II) and Platinum(II) with 2-Pyridinaldoxime," *J. Am. Chem. Soc.* 1960, 82(18), 4830-4834.

Kruis, F. E.; Fissan, H.; Peled, A. "Synthesis of nanoparticlesnext term in the gas phase for electronic, optical and magnetic applications," *Journal of Aerosol Science* 1998, 29(5-6), 511-535.

Magee, R. S. "U.S. chemical stockpile disposal program: the search for alternative technologies. In Effluents From Alternative Demilitarization Technologies," *NATO ASI Series 1 Disarmament Technologies*, 1998, 22, 1-12.

Mancin, F.; Tecilla, P.; Tonellato, U. "Metallomicelles Made of Ni(II) and Zn(II) Complexes of 2-Pyridinealdoxime-Based Ligands as Catalyst of the Cleavage of Carboxylic Acid Esters," *Langmuir* 2000, 16(1), 227-233.

Menger, F. M.; Gan, L. H.; Johnson, E.; Durst, D. H. "Phosphate ester hydrolysis catalyzed by metallomicelles," *J. Amer. Chem. Soc.* 1987, 109(9), 2800-2803.

Minegishi, S.; Mayr, H. "How Constant Are Ritchie's "Constant Selectivity Relationships"? A General Reactivity Scale for n-, pi-, and sigma-Nucleophiles," *J. Am. Chem. Soc.* 2003, 125(1), 286-295.

Moeser, G. D.; Roach, K. A.; Green, W. H.; Laibinis, P. E.; Hatton, T. A. "Water-Based Magnetic Fluids as Extractants for Synthetic Organic Compounds," *Ind. Eng. Chem. Res.* 2002, 41(19), 4739-4749.

Moss, R. A.; Chung, Y. C. "Immobilized iodosobenzoate catalysts for the cleavage of reactive phosphates," *J. Org. Chem.* 1990, 55(7), 2064-2069.

Murakami, Y.; and Martell, A. E. "Kinetic Studies of the Catalytic Hydrolysis of 1,3-Dicarboxyphenyl 2-Phosphate and 1-Methoxycarbonyl-3-carboxyphenyl 2-Phosphate," *J. Am. Chem. Soc.* 1964, 86, 2119-212.

Reiner, D.; Poe, D. P. "Removal of iron, copper, cadmium, cobalt, and nickel from sodium hydroxide by precipitation and extraction with phenyl-2-pyridyl ketoxime," *Anal. Chem.* 1977, 49(6), 889-891.

Russell, A. J. et al. "Biomaterials for mediation of chemical and biological warfare agents," *Annu. Rev. Biomed. Eng.* 2003, 5, 1-27.

Safarik, I.; Safarikova, M. "Use of magnetic techniques for the isolation of cells," *J. Chromatogr. B* 1999, 722, 33-53.

Shen, L. et al. "Bilayer Surfactant Stabilized Magnetic Fluids: Synthesis and Interactions at Interfaces," *Langmuir* 1999, 15, 447-453.

Shimidzu, T.; Chiba, H.; Yamazaki, K.; Minato, T. "Catalytic Properties of Poly(4(5)-vinylimidazole-co-acrylic acid) and Its Low Molecular Weight Analogues in the Hydrolyses of Various Substituted Phenyl Acetates," *Macromolecules* 1976, 9(4), 641-645.

Snow, A.; Barger, W.R. "A chemical comparison of methanesulfonyl fluoride with organofluorophosphorus ester anticholinesterase compounds," *Chem. Res. Toxicol.* 1988, 1, 379-384.

Tafesse, F.; Deppa, N. C. "Polymetallic complexes in microemulsions for the hydrolysis of 4-nitrophenyl phosphate: a bio-mimetic model for decontamination of organophosphates in the environment," *Ecotoxicology and Environmental Safety* 2004, 58(2), 260-266.

Tong, X. D. et al. "A Novel Magnetic Affinity Support for Protein Adsorption and Purification," *Biotechnol. Prog.* 2001, 17, 134-139.

Wagner, G. W.; Yang, Y.-C. "Rapid Nucleophilic/Oxidative Decontamination of Chemical Warfare Agents," *Ind. Eng. Chem. Res.* 2002, 41(8), 1925-1928.

Wagner-Jauregg, T. et al. "Model Reactions of Phosphorus-containing Enzyme Inactivators. IV.1a The Catalytic Activity of Certain Metal Salts and Chelates in the Hydrolysis of Diisopropyl Fluorophosphate," *J. Am. Chem. Soc.* 1955, 77(4), 922-929.

Xie, Y.; Popov, B. N. "Catalyzed Hydrolysis of Nerve Gases by Metal Chelate Compounds and Potentiometric Detection of the Byproducts," *Anal. Chem.* 2000, 72(9), 2075-2079.

Yang, Y. C. "Chemical detoxification of nerve agent," *Acc. Chem. Res.* 1999, 32, 109-15.

Yang, Y. C.; Baker, J. A.; Ward, J. R. "Decontamination of chemical warfare agents," *Chem. Rev.* 1992, 92(8), 1729-1743.

Bromberg, L. et al., "Decomposition of Toxic Environmental Contaminants by Recyclable Catalytic, Superparamagnetic Nanoparticles", *Ind. Eng. Chem. Res.*, 46:3296-3303(American Chemical Society, 2007).

Bromberg, L. et al., "Nerve Agent Destruction by Recyclable Catalytic Magnetic Nanoparticles", *Ind. Eng. Chem., Res.*, 44(21):7991-7998 (American Chemical Society, 2005).

Bunton, C. A. et al., "Quantitative Treatment of Reaction Rates in Functional Micelles and Comicelles", *J. Phys. Chem.*, 86(11):2103-2108 (American Chemical Society, 1982).

Cao, J. et al., "Preparation and radiolabeling of surface-modified magnetic nanoparticles with rhenium-188 for magnetic targeted radiotherapy", *Journal of Magnetism and Magnetic Particles*, 277:165-174 (Elesvier B.V. 2003).

Kar, S. et al., "COCHO-modified oxides nanoparticles by using phosphonic acid as grafting agent", *Tetrahedron Letters*, 44:5617-5619 (Elsevier Ltd., 2003).

Minegishi, S. et al., "How Constant Are Ritchie's 'Constant Selectivity Relationships'? A General Reactivity Scale for n-, π-, and σ-Nucleophiles", *J. Am. Chem. Soc.*, 125(1):286-295 (American Chemical Society, 2003).

Morales-Rojas, H. et al., "Phosphorolytic Reactivity of σ-Iodosylcarboxylates and Related Nucleophiles", *Chem. Rev.*, 102(7):2497-2521 (American Chemical Society, 2002).

Primožič, I. et al., "Pyridium, Imidazolium, and Quinucludinium Oximes: Synthesis, Interaction with Native and Phosphylated Cholinesterases, and Antidotes Against Organophosphorus Compounds", *J. Med. Chem. Def.*, 2:1-30 (Institute for Medical Research and Occupational Health and University of Zagreb, Department of Chemistry; Zagreb, Croatia, Jun. 2004).

Takafuji, M. et al., "Preparation of Poly(1-vinylimidazole)-Grafted Magnetic Nanoparticles and Their Application for Removal of Metal Ions", *Chem. Mater.*, 16(10):1977-1983 (American Chemical Society, 2004).

Partial International Search Report accompanying Invitation to Pay Additional Fees dated Jul. 21, 2008.

\* cited by examiner

[A]

[B]

[A]

[B]

CATALYTIC NANOPARTICLES FOR NERVE-AGENT DESTRUCTION

BACKGROUND OF THE INVENTION

The presence of organophosphate esters (OPE) in industrial and agricultural drain waters, spills, runoffs, and drifts, as well as OPE agent-based chemical munitions that may be released in case of warfare or terrorist attack, pose great risks to human health and the environment. The number of exposures to OPE due to pesticides and insecticides is estimated at some 3,000,000 per year, with the total number of deaths and casualties over 300,000 per year worldwide. Eyer, P. "The role of oximes in the management of organophosphorus pesticide poisoning," *Toxicol Rev.* 2003, 22(3), 165-190. Numerous OPE pesticides, insecticides and warfare agents, such as sarin, soman, and VX, in addition to being carcinogenic, act as nerve poisons which may cause cumulative damage to the nervous system and liver. The primary mechanism of action of the OPEs is irreversible inhibition of acetylcholinesterases, resulting in the accumulation of the neurotransmitter acetylcholine at nerve synapses. Structures of the nerve poison sarin and a model analog used in this study, diisopropyl fluorophosphate (DFP), are given in FIG. 1.

Some of the first OPE decontaminating agents were oxidizers, such as bleaching powders. See Yang, Y. C. et al. Yang, Y. C.; Baker, J. A.; Ward, J. R. "Decontamination of chemical warfare agents," *Chem. Rev.* 1992, 92(8), 1729-1743. However, it has been observed that the activity of bleaches decreases upon long-term storage; to have the desired effect, copious amounts of bleach must be used. Moreover, because bleaches are quite corrosive, they are not compatible with many surfaces.

At present, the decontamination solutions of choice are DS-2 (a non-aqueous liquid composed of diethylenetriamine, ethylene glycol, monomethyl ether, and sodium hydroxide) and STB (super tropical bleach). Although DS-2 is generally not corrosive to metal surfaces, it damages skin, paints, plastics, rubber, and leather materials. STB, while effective, has the same environmental problems as bleaches and cannot be used on the skin. Consequently, personal decontamination equipment typically consists of packets of wipes containing such chemicals as sodium hydroxide, ethanol, and phenol. These chemicals are selected to provide a nucleophilic attack at the phosphorous atom of nerve agents.

Alternatives to oxidizers have focused on the development of processes for the catalytic destruction (CD) of nerve agents and pesticides. Chiron, S. et al. "Pesticide chemical oxidation: state-of-the-art," Water Research 2000, 34(2), 366-377; and Russell, A. J. et al. "Biomaterials for mediation of chemical and biological warfare agents," *Annu. Rev. Biomed. Eng.* 2003, 5, 1-27. It was first recognized in the 1950s that certain metal ions, especially Cu(II), had the ability to catalyze the hydrolysis of nerve agents and their simulants. The catalytic activity of such chemicals was significantly enhanced when Cu(II) was bound to certain ligands. For example, diisopropyl phosphorofluoridate (DFP) has a hydrolytic half-life of approximately 2 days in water, 5 hours in water when $CUSO_4$ is added, and just 8 minutes in water when Cu(II) bound to either histidine or N,N'-dipyridyl is added in an approximately 2:1 ratio of metal complex to substrate. Sarin was found to be even more susceptible to metal-based catalysis with a half-life of only 1 minute in the presence of tetramethyl-EDA-Cu(II) complex (1:1 metal complex to substrate). However, the use of free copper-ligand complexes for catalyzing the degradation of nerve agents also has disadvantages. First, the nerve agent must be brought into contact with a solution of the metal-ion-containing catalyst. Second, the ratio of metal to chelate must be carefully controlled. Third, solubility issues can still limit the pH range and choice of chelates for use in a particular environment.

In addition, researchers have begun to look at enzymes stabilized by attachment to polymeric support as catalysts for the degradation of nerve agents. These enzymes, variously known as organophosphorous acid anhydrases, phosphotriesterases, sarinase, or others, are extracted either from microorganisms, such as *Pseudomonas diminuta*, or from squid. The enzymatic approach shows promise but is limited by the specificity of the proteins for their substrates, e.g., a parathion hydrolase would not be effective against another nerve agent. Further, the enzymes require a very specific range of conditions, e.g., pH, to function properly. In addition, field conditions can involve concentrated solutions of nerve agents, which can overwhelm the relatively low concentration of enzymes which can be immobilized on a support.

The shortcomings of the free metal-ligand complexes and enzymatic approaches has caused the majority of the practical catalytic destruction technologies to focus on acid-catalyzed or base-catalyzed hydrolysis or nucleophile-aided hydrolysis. Magee, R. S. "U.S. chemical stockpile disposal program: the search for alternative technologies. In Effluents From Alternative Demilitarization Technologies," ed. F W Holm, Dordrecht: Kluwer Acad., 1998, 22, 112; Amos, D.; Leake, B. "Clean-up of chemical agents on soils using simple washing or chemical treatment processes," *J. Hazard. Mater.* 1994, 39, 107 17; Yang, Y. C. "Chemical detoxification of nerve agent," *Acc. Chem. Res.* 1999, 32, 109-15; and Yang, Y. C.; Baker, J. A.; Ward, J. R. "Decontamination of chemical warfare agents," *Chem. Rev.* 1992, 92(8), 1729-1743. In this regard, α-nucleophiles, such as hydroperoxides, hypochlorite, iodosocarboxylates and oximates, have been investigated alone or in concert with surfactants. Wagner, G. W.; Yang, Y.-C. "Rapid Nucleophilic/Oxidative Decontamination of Chemical Warfare Agents," *Ind. Eng. Chem. Res.* 2002, 41(8), 1925-1928; Moss, R. A.; Chung, Y. C. "Immobilized iodosobenzoate catalysts for the cleavage of reactive phosphates," *J. Org. Chem.* 1990, 55(7), 2064-2069; and Fanti, M.; Mancin, F.; Tecilla, P.; Tonellato, U. "Ester Cleavage Catalysis in Reversed Micelles by Cu(II) Complexes of Hydroxy-Functionalized Ligands," *Langmuir* 2000, 16(26), 10115-10122. However, very few reagents are currently available that are both inexpensive and non-toxic as well as catalytic. Rather, most of these compounds show only stoichiometric dephosphorylating activities at neutral pH. Bhattacharya, S.; Snehalatha, K. "Evidence for the Formation of Acylated or Phosphorylated Monoperoxyphthalates in the Catalytic Esterolytic Reactions in Cationic Surfactant Aggregates," *J. Org. Chem.* 1997, 62(7), 2198-2204. Notable exceptions include micellar iodosobenzoate, and related derivatives, micelle-forming metallocomplexes, and immobilized metal chelate complexes. Moss, R. A.; Chung, Y. C. "Immobilized iodosobenzoate catalysts for the cleavage of reactive phosphates," *J. Org. Chem.* 1990, 55(7), 2064-2069; Menger, F. M.; Gan, L. H.; Johnson, E.; Durst, D. H. "Phosphate ester hydrolysis catalyzed by metallomicelles," *J. Amer. Chem. Soc.* 1987, 109(9), 2800-2803; and Chang et al. (US 2003/0054949 A1).

SUMMARY

The present invention provides compositions and methods for sorbing (e.g., adsorption and chemisorption) and destroying organophosphate chemical agents. To this end, the invention contemplates the use of finely divided, modified nanoscale metal oxide particles. In one embodiment, a suspension of magnetite ($Fe_3O_4$) nanoparticles modified with 2-pralidoxime or its polymeric analog, poly(4-vinylpyridine-N-phenacyloxime-co-acrylic acid), catalyzes the hydrolysis of organophosphate compounds at a neutral pH. The oxime-modified magnetite particles serve as a nano-sized particulate carrier with a powerful α-nucleophile, e.g., an oximate group, immobilized on its surface. The oxime-modified magnetite nanoparticles are colloidally stable at neutral pH and they are readily recovered from the aqueous milieu by high-gradient magnetic separation methods.

DETAILED DESCRIPTION OF THE INVENTION

Overview

Figure 1:
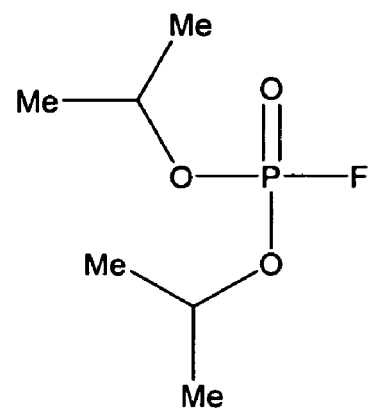
FIG. 1 depicts the chemical structures of [A] diisopropyl fluorophosphate (DFP) and [B] sarin.
Figure 1:
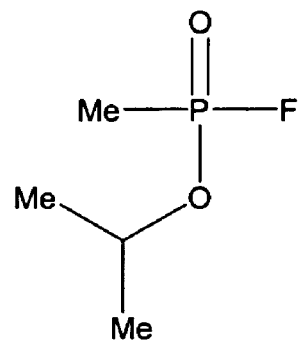

The present invention relates to compositions and methods for destroying dangerous substances, such as chemical and biological agents. Organophosphorus pesticides and warfare agents are not readily hydrolyzed in aqueous media without applying extremes of pH, heat, or bleach. Remarkably, the methods of the invention are carried out by contacting the target substance with particulate metal oxide modified with a nucleophilic group. For example, the metal oxides can be coated with a monomeric or polymeric substance comprising a nucleophilic group. In one embodiment, the modified particulate metal oxides are used in aqueous media. In another embodiment, the modified particulate metal oxides are used as air-detoxifying media by contacting the particulates with liquid droplets of organophosphate compound. For example, herein are disclosed methods of forming particulate metal oxide modified with a nucleophilic group via iron chloride co-precipitation with a stabilizing compound containing a nucleophilic group. In certain embodiments, said nucleophilic group is an oxime, hydroxamic acid or a salt thereof. Importantly, in certain embodiments the modified particulate metal oxide utilized in the methods of the invention is not harmful to equipment or to humans and can easily be used directly at the site of contamination. Said metal oxide can be optionally superparamagnetic, which enables useful recovery and reuse by means of magnetic separation.

Remarkably, suspensions of magnetite ($Fe_3O_4$) nanoparticles modified with common antidote, 2-pralidoxime (PAM) or its polymeric analog, poly(4-vinylpyridine-N-phenacyloxime-co-acrylic acid), catalyze the hydrolysis of an organophosphate-ester-containing compound at neutral pH. The oxime-modified magnetite particles function as a nano-sized particulate carrier with a powerful α-nucleophile, e.g. an oximate group, immobilized on its surface. It is demonstrated that the oxime-modified magnetite nanoparticles (hydrodynamic diameter of about 100 nm) are colloidally stable at neutral pH. Moreover, they are readily recovered from the aqueous milieu by high-gradient magnetic separation methods.

The immobilized metal complexes of the present invention have uses in addition to their use to decontaminate areas contaminated with nerve agents and/or pesticides. For example, the catalytic hydrolysis of nerve agents and/or pesticides using the compositions of the present invention can be employed as the operative process step in a detector system wherein the by-products of the hydrolysis reaction, such as hydrogen fluoride, may be subject to measurement to provide an indication of the presence and/or concentration of a particular phosphate ester in the environment. Additionally, the adsorbent nucleophilic particles of the instant invention may be fabricated in the form of filters, sponges, wipes, powder or any other form suitable for use in a decontamination process. For example, the particles of the invention may be used in gas masks, wearable protective garments, air filtration systems, and the like.

DEFINITIONS

For convenience, before further description of the present invention, certain terms employed in the specification, examples and appended claims are collected here. These definitions should be read in light of the remainder of the disclosure and understood as by a person of skill in the art. Unless defined otherwise, all technical and scientific terms used herein have the same meaning as commonly understood by a person of ordinary skill in the art.

The articles "a" and "an" are used herein to refer to one or to more than one (i.e., to at least one) of the grammatical object of the article. By way of example, "an element" means one element or more than one element.

The term "associated with" as used herein in such phrases as, for example, "an inorganic metal oxide associated with an stabilizing compound," refers to the presence of either weak or strong or both interactions between molecules. For example weak interactions may include, for example, electrostatic, van der Waals, or hydrogen-bonding interactions. Stronger interactions, also referred to as being chemically bonded, refer to, for example, covalent, ionic, or coordinative bonds between two molecules. The term "associated with" also refers to a compound that may be physically intertwined within the foldings of another molecule, even when none of the above types of bonds are present. For example, an inorganic compound may be considered as being in association with a polymer by virtue of it existing within the interstices of the polymer.

The terms "comprise" and "comprising" are used in the inclusive, open sense, meaning that additional elements may be included.

The term "including" is used to mean "including but not limited to". "Including" and "including but not limited to" are used interchangeably.

The term "polymer" is used to mean a large molecule formed by the union of repeating units (monomers). The term polymer also encompasses copolymers.

The term "co-polymer" is used to mean a polymer of at least two or more different monomers.

The term "particle size" is used to mean a number-average or weight-average particle size as measured by conventional particle size measuring techniques well known to those skilled in the art, such as dynamic or static light-scattering, sedimentation field-flow fractionation, photon-correlation spectroscopy, or disk centrifugation. By "an effective average particle size of less than about 1000 nm" it is meant that at least about 90% of the particles have a number-average or weight-average particle size of less than about 1000 nm when measured by at least one of the above-noted techniques.

The term "interstices" is used to mean a space, especially a small or narrow one, between things or parts.

The term "chemical coprecipitation" as used herein refers to a common technique for making aqueous magnetic fluids from metal salts. This technique may be used to produce ferrite particles, such as magnetite ($Fe_3O_4$), maghemite ($\gamma$-$Fe_2O_3$), or cobalt ferrite ($CoFe_2O_4$).

The term "diamagnetic" as used herein means having a negative magnetic susceptibility.

The term "magnet" as used herein refers to a substance composed of ferromagnetic or ferrimagnetic material having domains that are aligned to produce a net magnetic field outside the substance or to experience a torque when placed in an external magnetic field.

The term "magnetic core" as used herein refers to a piece of magnetic material, often of iron oxide or ferrite that is within a copolymer shell, coil, transformer, or electromagnet.

The term "magnetic field" as used herein refers to a vector field occupying physical space wherein magnetic forces may be detected, typically in the presence of a permanent magnet, current-carrying conductor, or an electromagnetic wave.

The term "magnetic field strength" as used herein refers to a vector field used to describe magnetic phenomena, having the property that the curl of the field is equal to the free current density vector in the meter-kilogram-second system of units.

The term "magnetic separation" as used herein refers to a process that uses a magnetic solid and an external magnetic field to separate materials or compounds. Examples of magnetic separation include magnetocollection, magnetoflocculation, and magnetoanisotropic sorting.

The term "magnetic susceptibility" as used herein refers to the ratio of the magnetization of a substance to the applied magnetic field strength.

The term "magnetite" as used herein refers to a chemical compound represented as $Fe_2O_3 \cdot FeO$ or $Fe_3O_4$ in the spinel iron oxide species with a 2:1 molar ratio of Fe ions that are present in their III and II oxidation states, respectively.

The term "magnetite nanoparticles" as used herein refers to either the magnetic core of the magnetic particles that make up a magnetic fluid, or to the magnetic particles as a whole, including both the magnetite core and the polymer shell that stabilizes them in the surrounding liquid.

The term "non-magnetic particle" as used herein refers to a particle that does not have inherent magnetic properties.

The term "superparamagnetism" as used herein refers to the tendency of fine particles to behave independently of one another in a manner similar to paramagnets, so that the particles show a net magnetization in the presence of a magnetic field, but then rapidly relax to show zero net magnetization when the applied magnetic field is removed.

The term "nucleophile" is recognized in the art, and as used herein means a chemical moiety having a reactive pair of electrons. Examples of nucleophiles include uncharged compounds, such as water, amines, mercaptans and alcohols, and charged moieties, such as alkoxides, thiolates, carbanions, oximes and a variety of organic and inorganic anions.

The term "$\alpha$-nucleophile" is recognized in the art, and as used herein means a nucleophile possessing a heteroatom with an unshared electron pair adjacent to the nucleophilic center.

The term "n-nucleophile" is recognized in the art, and as used here means a nucleophile comprising a lone pair of electronics in a non-bonding orbital.

The term "aliphatic" is an art-recognized term and includes linear, branched, and cyclic alkanes, alkenes, or alkynes. In certain embodiments, aliphatic groups in the present invention are linear or branched and have from 1 to about 20 carbon atoms.

The term "alkyl" is art-recognized, and includes saturated aliphatic groups, including straight-chain alkyl groups, branched-chain alkyl groups, cycloalkyl (alicyclic) groups, alkyl substituted cycloalkyl groups, and cycloalkyl substituted alkyl groups. In certain embodiments, a straight chain or branched chain alkyl has about 30 or fewer carbon atoms in its backbone (e.g., $C_1$-$C_{30}$ for straight chain, $C_3$-$C_{30}$ for branched chain), and alternatively, about 20 or fewer. Likewise, cycloalkyls have from about 3 to about 10 carbon atoms in their ring structure, and alternatively about 5, 6 or 7 carbons in the ring structure.

Unless the number of carbons is otherwise specified, "lower alkyl" refers to an alkyl group, as defined above, but having from one to ten carbons, alternatively from one to about six carbon atoms in its backbone structure. Likewise, "lower alkenyl" and "lower alkynyl" have similar chain lengths.

The term "aralkyl" is art-recognized, and includes alkyl groups substituted with an aryl group (e.g., an aromatic or heteroaromatic group).

The terms "alkenyl" and "alkynyl" are art-recognized, and include unsaturated aliphatic groups analogous in length and possible substitution to the alkyls described above, but that contain at least one double or triple bond respectively.

The term "heteroatom" is art-recognized, and includes an atom of any element other than carbon or hydrogen. Illustrative heteroatoms include boron, nitrogen, oxygen, phosphorus, sulfur and selenium, and alternatively oxygen, nitrogen or sulfur.

The term "aryl" is art-recognized, and includes 5-, 6- and 7-membered single-ring aromatic groups that may include from zero to four heteroatoms, for example, benzene, naphthalene, anthracene, pyrene, pyrrole, furan, thiophene, imidazole, oxazole, thiazole, triazole, pyrazole, pyridine, pyrazine, pyridazine and pyrimidine, and the like. Those aryl groups having heteroatoms in the ring structure may also be referred to as "heteroaryl" or "heteroaromatics." The aromatic ring may be substituted at one or more ring positions with such substituents as described above, for example, halogen, azide, alkyl, aralkyl, alkenyl, alkynyl, cycloalkyl, hydroxyl, alkoxyl, amino, nitro, sulfhydryl, imino, amido, phosphonate, phosphinate, carbonyl, carboxyl, silyl, ether, alkylthio, sulfonyl, sulfonamido, ketone, aldehyde, ester, heterocyclyl, aromatic or heteroaromatic moieties, —CF$_3$, —CN, or the like. The term "aryl" also includes polycyclic ring systems having two or more cyclic rings in which two or more carbons are common to two adjoining rings (the rings are "fused rings") wherein at least one of the rings is aromatic, e.g., the other cyclic rings may be cycloalkyls, cycloalkenyls, cycloalkynyls, aryls and/or heterocyclyls.

The terms ortho, meta and para are art-recognized and apply to 1,2-, 1,3- and 1,4-disubstituted benzenes, respectively. For example, the names 1,2-dimethylbenzene and ortho-dimethylbenzene are synonymous.

The terms "heterocyclyl" and "heterocyclic group" are art-recognized, and include 3- to about 10-membered ring structures, such as 3- to about 7-membered rings, whose ring structures include one to four heteroatoms. Heterocycles may also be polycycles. Heterocyclyl groups include, for example, thiophene, thianthrene, furan, pyran, isobenzofuran, chromene, xanthene, phenoxathiin, pyrrole, imidazole, pyrazole, isothiazole, isoxazole, pyridine, pyrazine, pyrimidine, pyridazine, indolizine, isoindole, indole, indazole, purine, quinolizine, isoquinoline, quinoline, phthalazine, naphthyridine, quinoxaline, quinazoline, cinnoline, pteridine, carbazole, carboline, phenanthridine, acridine, pyrimidine, phenanthroline, phenazine, phenarsazine, phenothiazine, furazan, phenoxazine, pyrrolidine, oxolane, thiolane, oxazole, piperidine, piperazine, morpholine, lactones, lactams such as azetidinones and pyrrolidinones, sultams, sultones, and the like. The heterocyclic ring may be substituted at one or more positions with such substituents as described above, as for example, halogen, alkyl, aralkyl, alkenyl, alkynyl, cycloalkyl, hydroxyl, amino, nitro, sulfhydryl, imino, amido, phosphonate, phosphinate, carbonyl, carboxyl, silyl, ether, alkylthio, sulfonyl, ketone, aldehyde, ester, a heterocyclyl, an aromatic or heteroaromatic moiety, —CF$_3$, —CN, or the like.

The terms "polycyclyl" and "polycyclic group" are art-recognized, and include structures with two or more rings (e.g., cycloalkyls, cycloalkenyls, cycloalkynyls, aryls and/or heterocyclyls) in which two or more carbons are common to two adjoining rings, e.g., the rings are "fused rings". Rings that are joined through non-adjacent atoms, e.g., three or more atoms are common to both rings, are termed "bridged" rings. Each of the rings of the polycycle may be substituted with such substituents as described above, as for example, halogen, alkyl, aralkyl, alkenyl, alkynyl, cycloalkyl, hydroxyl, amino, nitro, sulfhydryl, imino, amido, phosphonate, phosphinate, carbonyl, carboxyl, silyl, ether, alkylthio, sulfonyl, ketone, aldehyde, ester, a heterocyclyl, an aromatic or heteroaromatic moiety, —CF$_3$, —CN, or the like.

The term "carbocycle" is art recognized and includes an aromatic or non-aromatic ring in which each atom of the ring is carbon. The flowing art-recognized terms have the following meanings: "nitro" means —NO$_2$; the term "halogen" designates —F, —Cl, —Br or —I; the term "sulfhydryl" means —SH; the term "hydroxyl" means —OH; and the term "sulfonyl" means —SO$_2^-$.

The terms "amine" and "amino" are art-recognized and include both unsubstituted and substituted amines, e.g., a moiety that may be represented by the general formulas:

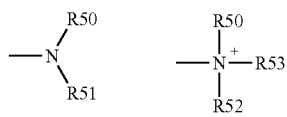

wherein R50, R51 and R52 each independently represent a hydrogen, an alkyl, an alkenyl, —(CH$_2$)$_m$—R61, or R50 and R51, taken together with the N atom to which they are attached complete a heterocycle having from 4 to 8 atoms in the ring structure; R61 represents an aryl, a cycloalkyl, a cycloalkenyl, a heterocycle or a polycycle; and m is zero or an integer in the range of 1 to 8. In certain embodiments, only one of R50 or R51 may be a carbonyl, e.g., R50, R51 and the nitrogen together do not form an imide. In other embodiments, R50 and R51 (and optionally R52) each independently represent a hydrogen, an alkyl, an alkenyl, or —(CH$_2$)$_m$—R61. Thus, the term "alkylamine" includes an amine group, as defined above, having a substituted or unsubstituted alkyl attached thereto, i.e., at least one of R50 and R51 is an alkyl group.

The term "acylamino" is art-recognized and includes a moiety that may be represented by the general formula:

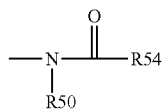

wherein R50 is as defined above, and R54 represents a hydrogen, an alkyl, an alkenyl or —(CH$_2$)$_m$—R61, where m and R61 are as defined above.

The term "amido" is art recognized as an amino-substituted carbonyl and includes a moiety that may be represented by the general formula:

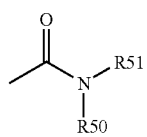

wherein R50 and R51 are as defined above. Certain embodiments of the amide in the present invention will not include imides which may be unstable.

The term "alkylthio" is art recognized and includes an alkyl group, as defined above, having a sulfur radical attached thereto. In certain embodiments, the "alkylthio" moiety is represented by one of —S-alkyl, —S-alkenyl, —S-alkynyl, and —S—(CH$_2$)$_m$—R61, wherein m and R61 are defined above. Representative alkylthio groups include methylthio, ethyl thio, and the like.

The term "carbonyl" is art recognized and includes such moieties as may be represented by the general formulas:

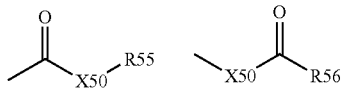

wherein X50 is a bond or represents an oxygen or a sulfur, and R55 represents a hydrogen, an alkyl, an alkenyl, —(CH$_2$)$_m$—R61 or a pharmaceutically acceptable salt, R56 represents a hydrogen, an alkyl, an alkenyl or —(CH$_2$)$_m$—R61, where m and R61 are defined above. Where X50 is an oxygen and R55 or R56 is not hydrogen, the formula represents an "ester". Where X50 is an oxygen, and R55 is as defined above, the moiety is referred to herein as a carboxyl group, and particularly when R55 is a hydrogen, the formula represents a "carboxylic acid". Where X50 is an oxygen, and R56 is hydrogen, the formula represents a "formate". In general, where the oxygen atom of the above formula is replaced by sulfur, the formula represents a "thiocarbonyl" group. Where X50 is a sulfur and R55 or R56 is not hydrogen, the formula represents a "thioester." Where X50 is a sulfur and R55 is hydrogen, the formula represents a "thiocarboxylic acid." Where X50 is a sulfur and R56 is hydrogen, the formula represents a "thioformate." On the other hand, where X50 is a bond, and R55 is not hydrogen, the above formula represents a "ketone" group. Where X50 is a bond, and R55 is hydrogen, the above formula represents an "aldehyde" group.

The terms "alkoxyl" or "alkoxy" are art recognized and include an alkyl group, as defined above, having an oxygen radical attached thereto. Representative alkoxyl groups include methoxy, ethoxy, propyloxy, tert-butoxy and the like. An "ether" is two hydrocarbons covalently linked by an oxygen. Accordingly, the substituent of an alkyl that renders that alkyl an ether is or resembles an alkoxyl, such as may be represented by one of —O-alkyl, —O-alkenyl, —O-alkynyl, —O—(CH$_2$)$_m$—R61, where m and R61 are described above.

The term "oxime" is an art recognized moiety that may be represented by the general formula:

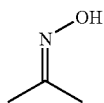

An "oximate anion" is a deprotonated oxime. Examples of useful oximes readily forming oximate anions include, but are not limited to, salicylaldoxime, 2-pyridinealdoxime, 2-hydroxy-5-nonylacetophenone oxime, 1-cetyl-3-(2-oximopropyl)imidazolium chloride, oxime methacrylate, hexadecyltrimethylammonium anti-pyruvaldehyde 1-oximate, anti-pyruvaldehyde 1-oxime (monoisonitrosoacetone), O-(2, 3,4,5,6-pentafluorobenzyl)hydroxylamine hydrochloride, 1,1'-trimethylene bis(4-hydroxyiminomethyl)pyridinium dichloride (trimedoxime), 4-amino-4-methyl-2-pentanone oxime, and the like.

The term "hydroxamic acid" is an art recognized moiety that may be represented by the general formula:

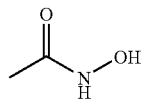

A "hydroxamate anion" is a deprotonated hydroxamic acid.

The term "sulfonate" is art recognized and includes a moiety that may be represented by the general formula:

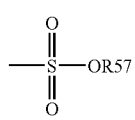

in which R57 is an electron pair, hydrogen, alkyl, cycloalkyl, or aryl.

The term "sulfate" is art recognized and includes a moiety that may be represented by the general formula:

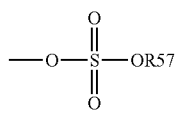

in which R57 is as defined above.

The term "sulfonamido" is art recognized and includes a moiety that may be represented by the general formula:

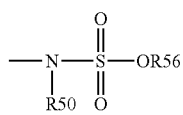

in which R50 and R56 are as defined above.

The term "sulfamoyl" is art-recognized and includes a moiety that may be represented by the general formula:

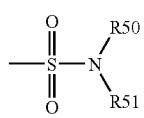

in which R50 and R51 are as defined above.

The term "sulfonyl" is art recognized and includes a moiety that may be represented by the general formula:

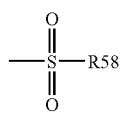

in which R58 is one of the following: hydrogen, alkyl, alkenyl, alkynyl, cycloalkyl, heterocyclyl, aryl or heteroaryl.

The term "sulfoxido" is art recognized and includes a moiety that may be represented by the general formula:

in which R58 is defined above.

Analogous substitutions may be made to alkenyl and alkynyl groups to produce, for example, aminoalkenyls, aminoalkynyls, amidoalkenyls, amidoalkynyls, iminoalkenyls, iminoalkynyls, thioalkenyls, thioalkynyls, carbonyl-substituted alkenyls or alkynyls.

As used herein "-alkyl" or "alkyl-" refers to a radical such as —CH$_2$CH$_3$, while "-alkyl-"refers to a diradical such as —CH$_2$CH$_2$—; -heteroaryl- refers to a diradical such as

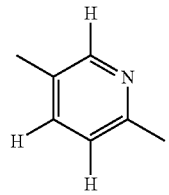

though it also encompasses diradicals such as

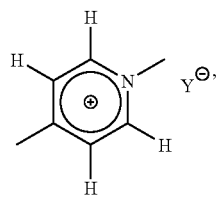

with the counterion (Y$^-$) being an anion, such as Br, Cl, I, OMs or OTf.

The definition of each expression, e.g. alkyl, m, n, and the like, when it occurs more than once in any structure, is intended to be independent of its definition elsewhere in the same structure.

The term "selenoalkyl" is art-recognized and refers to an alkyl group having a substituted seleno group attached thereto. Exemplary "selenoethers" which may be substituted on the alkyl are selected from one of —Se-alkyl, —Se-alkenyl, —Se-alkynyl, and —Se—(CH2)$_m$—R61, m and R61 being defined above.

The terms triflyl, tosyl, mesyl, and nonaflyl are art-recognized and refer to trifluoromethanesulfonyl, p-toluenesulfonyl, methanesulfonyl, and nonafluorobutanesulfonyl groups, respectively. The terms triflate, tosylate, mesylate, and nonaflate are art-recognized and refer to trifluoromethanesulfonate ester, p-toluenesulfonate ester, methanesulfonate ester, and nonafluorobutanesulfonate ester functional groups and molecules that contain said groups, respectively.

The abbreviations Me, Et, Ph, Tf, Nf, Ts, and Ms represent methyl, ethyl, phenyl, trifluoromethanesulfonyl, nonafluorobutanesulfonyl, p-toluenesulfonyl and methanesulfonyl, respectively. A more comprehensive list of the abbreviations utilized by organic chemists of ordinary skill in the art appears in the first issue of each volume of the Journal of Organic Chemistry; this list is typically presented in a table entitled Standard List of Abbreviations.

Certain compounds contained in compositions of the present invention may exist in particular geometric or stereoisomeric forms. In addition, polymers of the present invention may also be optically active. The present invention contemplates all such compounds, including cis- and trans-isomers, R- and S-enantiomers, diastereomers, (d)-isomers, (l)-isomers, the racemic mixtures thereof, and other mixtures thereof, as falling within the scope of the invention. Additional asymmetric carbon atoms may be present in a substituent such as an alkyl group. All such isomers, as well as mixtures thereof, are intended to be included in this invention.

If, for instance, a particular enantiomer of compound of the present invention is desired, it may be prepared by asymmetric synthesis, or by derivation with a chiral auxiliary, where the resulting diastereomeric mixture is separated and the auxiliary group cleaved to provide the pure desired enantiomers. Alternatively, where the molecule contains a basic functional group, such as amino, or an acidic functional group, such as carboxyl, diastereomeric salts are formed with an appropriate optically-active acid or base, followed by resolution of the diastereomers thus formed by fractional crystallization or chromatographic means well known in the art, and subsequent recovery of the pure enantiomers.

It will be understood that "substitution" or "substituted with" includes the implicit proviso that such substitution is in accordance with permitted valence of the substituted atom and the substituent, and that the substitution results in a stable compound, e.g., which does not spontaneously undergo transformation such as by rearrangement, cyclization, elimination, or other reaction.

The term "substituted" is also contemplated to include all permissible substituents of organic compounds. In a broad aspect, the permissible substituents include acyclic and cyclic, branched and unbranched, carbocyclic and heterocyclic, aromatic and nonaromatic substituents of organic compounds. Illustrative substituents include, for example, those described herein above. The permissible substituents may be one or more and the same or different for appropriate organic compounds. For purposes of this invention, the heteroatoms such as nitrogen may have hydrogen substituents and/or any permissible substituents of organic compounds described herein which satisfy the valences of the heteroatoms. This invention is not intended to be limited in any manner by the permissible substituents of organic compounds.

The phrase "protecting group" as used herein means temporary substituents which protect a potentially reactive functional group from undesired chemical transformations. Examples of such protecting groups include esters of carboxylic acids, silyl ethers of alcohols, and acetals and ketals of aldehydes and ketones, respectively. The field of protecting group chemistry has been reviewed (Greene, T. W.; Wuts, P.G.M. Protective Groups in Organic Synthesis, 2nd ed.; Wiley: New York, 1991). Protected forms of the inventive compounds are included within the scope of this invention.

For purposes of the invention, the chemical elements are identified in accordance with the Periodic Table of the Elements, CAS version, Handbook of Chemistry and Physics, 67th Ed., 1986-87, inside cover.

Metals

The metal in the nanoparticles of the present invention may be in the form of a cation belonging to Groups 1-15 of the Periodic Table. These metals include Li, Na, K, Mg, Ca, Sr, Ba, Sc, Y, La, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, and Hg. The term "metal" is also used to include metalloids belonging to groups 13-15. These metalloids include B, Al, Ga, In, Ti, Si, Ge, Sn, Pb, As, Sb, and Bi. In certain embodiments, the metal cations belong to Groups 8-12, which include Fe, Ru, Os, Co, Rh, Ir, Ni, Pd, Pt, Cu, Ag, Au, Zn, Cd, and Hg. Preferably, the metal cations of the invention are Fe, Ni, Cu or Zn. Preferably, the metal oxides are magnetic metal oxides. Magnetic metal oxides of the invention may include Fe either as Fe(II), Fe(III), or a mixture of Fe(II)/Fe(III). Non-limiting examples of such oxides include FeO, $Fe_2O_3$, and $Fe_3O_4$. The inorganic compound may also be a mixed oxide of the type $M^1_x M^2_{3-x}O_4$, wherein $M^1$ represents a divalent metal ion and $M^2$ represents a trivalent metal ion. For example, the inorganic compound may be magnetic ferrites of the formula $M^1Fe_2O_4$, wherein $M^1$ represents a divalent ion selected from the following: Mn, Co, Ni, Cu, Zn, or Ba, pure or in admixture with each other or in admixture with ferrous ions.

Particle Preparation

The inorganic compound used to prepare the compositions of the present invention can generally be any inorganic compound prepared in an aqueous or nonaqueous medium. In one embodiment, catalytic nanoparticles comprising transition metal oxides alone or complexed with nucleophilic groups can be deposited on the surface of ion-exchange resins such as cationic or anionic cross-linked beads.

(a) Synthesis via Co-Precipitation—In one embodiment, the inorganic compound is a metal oxide prepared by dissolving a metal salt precursor in an aqueous medium. For example, iron oxides (such as $Fe_3O_4$ or $\gamma$-$Fe_2O_3$) may be synthesized through the co-precipitation of $Fe^{2+}$ and $Fe^{3+}$ aqueous salt solutions by addition of a base. The control of size, shape and composition of such iron nanoparticles depends on the type of salts used (e.g., chlorides, sulphates, nitrates, perchlorates, etc.), the $Fe^{2+}$ and $Fe^{3+}$ ratio, as well as the pH and ionic strength of the media.

In one embodiment, to obtain catalytic magnetic particles, we employed a co-precipitation of iron (II) and (III) chlorides by ammonia. The molar stoichiometry (1:2) of the $Fe^{2+}/Fe^{3+}$ was chosen such that it results in magnetite ($Fe_3O_4$) under non-oxidizing conditions, with or without a stabilizing compound, as shown below. Kim, D. K. et al. "Protective Coating of Superparamagnetic Iron Oxide Nanoparticles," *Chem. Mater.* 2003, 15(8), 1617-1627. The overall reaction can be represented as:

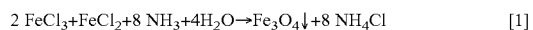

$$2\,FeCl_3+FeCl_2+8\,NH_3+4H_2O \rightarrow Fe_3O_4\downarrow +8\,NH_4Cl \quad [1]$$

As mentioned above, the size, composition, and magnetization of the resultant nanoparticles are affected by the reagent concentrations, the graft copolymer concentration, the temperature, and the pH during synthesis. Feltin, N.; Pileni, M. P. *Langmuir* 1997, 13, 3927-3933; Blums, E. et al. *Magnetic Fluids*, Walter de Gruyter and Co.: Berlin, Germany, 1996; U.S. Pat. No. 4,094,804; Shen, L. et al. *Langmuir* 1999, 15, 447-453; Bica, D. *Romanian Rep. Phys.* 1995, 47, 265-272. The optimal reaction temperature for the formation of magnetite is generally thought to be approximately 80° C. Shen, L et al. *Langmuir* 1999, 15, 447-453; Bica, D. *Romanian Rep. Phys.* 1995, 47, 265-272. Prior to the precipitation, the iron in the aqueous mixture may be associated with a nucleophilic stabilizing compound, exemplary examples of which are outlined below.

(b) Synthesis via Microemulsions—In another embodiment, metal nanoparticles may be synthesized in a microemulsion system with an internal structure consisting of small droplets. The water-in oil microemulsion is composed of nanosized compartments made up of the hydrophilic moiety of the surfactant filled with water. In the hydrophilic interior of these droplets, certain amount of water-soluble material can be dissolved; for example, transition metal salts which can then serve as precursor(s) for formation of metal nanoparticles. For example, nanoparticles may be obtained from microemulsions by the mixing two microemulsions, one containing the precursor and the other the precipitating agent; or by addition of the precipitating agent directly to the microemulsion containing the metal precursor. The preparation of catalytic nanoparticles from mini- and microemulsions is known in the art. Eriksson, S.; Nylen, U.; Rojas, S.; Boutonnet, M. "Preparation of catalysts from microemulsions and their applications in heterogeneous catalysis," *Applied Catalysis A: General* 2004, 265(2), 207-219. As described above, prior to the precipitation the metal(s) in the aqueous mixture may be associated with a nucleophilic stabilizing compound, exemplary examples of which are outlined below.

(c) Synthesis in Water—Furthermore, nanoparticles of the invention may be obtained as water dispersions or through reaction in water. The aqueous medium enables the required segregation at the nanometric scale and control of particle size and structure; in other words, it promotes self-assembling of amphiphilic (macro)molecules and adsorption of organic or inorganic precursors onto preformed particles or aggregates. Water can preferably participate to the hybrid construction as a reactive solvent, in a sol-gel processes known in the art. Examples of core-shell hybrid particles include, but not limited to, organic core and inorganic shell, inorganic core and organic shell, and/or more complex heterophase structures. In one embodiment the nanoparticles may be be obtained via the encapsulation of preformed particles through controlled surface-graft polymerization, heterocoagulation, sol-gel co-condensation or dispersed phase polymerization processes; or the self-assembly of amphiphilic or water-insoluble low molecular weight or polymeric molecules, conducive to a thermodynamically stable system as opposed to most colloidal dispersions where only kinetic stabilization can be achieved; or a one-pot sequential or simultaneous twofold polymerization processes (e.g., free-radical and sol-gel). Castelvetro, V.; De Vita, C. "Nanostructured hybrid materials from aqueous polymer dispersions," *Adv. Colloid Interface Sci.* 2004, 108/109, 167-185.

(d) Synthesis in the Gas Phase—In another embodiment, the metal nanoparticles of the present invention may be synthesized in the gas phase. Synthesis of nanoparticles in the gas phase is based on homogeneous nucleation in the gas phase and subsequent condensation and coagulation. The ablation of a solid source with a pulsed laser can preferably yield nanoparticles. Clusters or even larger particles are ejected from the surface and may undergo coagulation. A micron-sized aerosol droplet can preferably yield nanoparticles by evaporating a solute-containing droplet. By choosing a sufficiently dilute solute, nanoparticles of the instant invention may be obtained. In one embodiment electrospray systems may be applied as droplet generators, as they produce very small droplets being quite monodisperse in comparison to other spray processes. Furthermore, droplet explosion due to an electrical charge which exceeds the Rayleigh limit during evaporation may yield even smaller droplets. Finally, initiating homogeneous nucleation inside aerosol droplets can result in many nanosized nuclei in the droplet, which upon drying will yield nanoparticles. Synthesis of magnetic nanoparticles is known in the art. Kruis, F. E.; Fissan, H.; Peled, A. "Synthesis of nanoparticlesnext term in the gas phase for electronic, optical and magnetic applications," *Journal of Aerosol Science* 1998, 29(5-6), 511-535.

Exemplary Nucleophilic Stabilizing Compounds

In certain embodiments, the inorganic compound of the invention is associated with a nucleophile-containing organic monomer or a polymer ("a stabilizing compound") which is capable of decomposing organophosphorus compounds. In certain embodiments, exemplary nucleophiles of the invention are "α-nucleophiles" (i.e., nucleophiles possessing a heteroatom with an unshared electron pair adjacent to the nucleophilic center), such as oximes, hydroxamic acids, hydrazines, hydrazones, and sulfoxides. Also contemplated are heteroatom-containing resonance stabilized nucleophiles, wherein an $sp^2$-hybridized carbon atom is the center of nucleophilicity, such as enamines and phenoxide ions. Additionally, n-nucleophiles may serve as nucleophiles of the invention. Examples of n-nucleophiles can be found in S. Minegisihi et al. Minegishi, S.; Mayr, H. "How Constant Are Ritchie's "Constant Selectivity Relationships"? A General Reactivity Scale for n-, pi-, and sigma-Nucleophiles," *J. Am. Chem. Soc.* 2003, 125(1), 286-295.

Polymers of the invention may be co-polymerized and cross-linked with various amounts of monomers. Such monomers include, for example, isocyanates, imidazoles, amines, epoxides, amides, triphosphates peroxides, silanes, sulfones, acids, anhydrides, alkanes, alkenes and metal oxides. Non-limiting examples of such monomers include epichlorohydrin, divinyl sulfone, acrylic acid, methacrylic acid, trifluoromethacrylic acid, 2-vinylpyridine, 4-vinylpyridine, 3(5)-vinylpyridine, p-methylbenzoic acid, itaconic acid, 1-vinylimidazole, and mixtures thereof.

In certain embodiments, the coating comprises 2-pyridinealdoxime [PAM], poly(4-vinylpyridine-co-acrylic acid) [p(VP-AA)], or a p(VP-AA) which has undergone oximation [p(VPOx-AA)]. See FIG. 2; and G. I. H. Hanania et al. Hanania, G. I. H.; Michailides, M. S.; Irvine, D. H. *J. Phys. Chem.* 1977, 81(14), 1382-1387; and Hanania, G. I. H.; Irvine, D. H.; Shurayh, F. R. *J. Phys. Chem.* 1968, 72(4), 1355-1361. Complexes between PAM and related metal ions have been depicted. R. A. Krause et al. Krause, R. A.; Busch, D. H. "The Complexes of Nickel(II), Palladium(II) and Platinum(II) with 2-Pyridinaldoxime," *J. Am. Chem. Soc.* 1960, 82(18), 4830-4834.

PAM is a potent re-activator of the acetylcholinesterase inhibited by the OPE nerve agents and its administration, together with atropine, comprises standard organophosphate antidotal therapy. Eyer, P. "The role of oximes in the management of organophosphorus pesticide poisoning," *Toxicol Rev.* 2003, 22(3), 165-190; and Holstege, C. P.; Dobmeier, S. G. "Nerve Agent Toxicity and Treatment," *Curr. Treat. Options Neurol.* 2005, 7(2), 91-98. Studies have shown that PAM decomposes the OPE poisons via nucleophilic attack where the oximate ion is an active species.

PAM forms chelates with metal ions, such as $Cu^{2+}$ and $Ni^{2+}$, and the resulting complexes catalyze the decomposition of the OPE compounds, such as DFP and sarin, albeit less vigorously than some Cu(II)-dipyridyl and Cu(II)-imidazole complexes. Bolton, S.; Beckett, A. "Metal chelates as potential reactivators of organic phosphate poisoned acetylcholinesterase," *J. Pharm. Sci.* 1964, 53, 55-60; and Wagner-Jauregg, T. et al. "Model Reactions of Phosphorus-containing Enzyme Inactivators. IV.1a The Catalytic Activity of Certain Metal Salts and Chelates in the Hydrolysis of Diisopropyl Fluorophosphate," *J. Am. Chem. Soc.* 1955, 77(4), 922-929. Copper chelates with a 1:1 molar ratio of the $Cu^{2+}$ ion to ligands, such as α-amino acids or diamines, were reported to be in a class on their own as catalysts of the DFP and sarin hydrolysis, while analogous iron (II) and (III) complexes were devoid of catalytic activity. Courtney, R. C. et al. "Metal Chelate Compounds as Catalysts in the Hydrolysis of Isopropyl Methylphosphonofluoridate and Diisopropylphosphorofluoridate," *J. Am. Chem. Soc.* 1957, 79(12), 3030-3036. Interestingly, no data on complexes of PAM and iron in OPE decomposition appears to have been gathered. Bolton, S.; Beckett, A. "Metal chelates as potential reactivators of organic phosphate poisoned acetylcholinesterase," *J. Pharm. Sci.* 1964, 53, 55-60; and Breslow, R.; Chipman, D. "Mixed Metal Complexes as Enzyme Models. I. Intracomplex Nucleophilic Catalysis by an Oxime Anion," *J. Am. Chem. Soc.* 1965, 87(18), 4195-4196. The PAM and a single iron ion have been described to form, in aqueous solution, a low-spin octahedral complex in which iron is bonded to six nitrogen atoms. Hanania, G. I. H. et al. "Reduction potentials of complex ions. The tris(pyridine-2-aldoxime)iron(III)-tris(pyridine-2-aldoxime)iron(II) system," *J. Phys. Chem.* 1968, 72(4), 1355-1361. We reasoned that the iron-PAM complex molecule, with its three polar oxime-OH groups, would remain on the surface of a magnetite particle upon co-precipitation of PAM with iron ions. The resulting nucleophile-modified magnetite was reasoned to be active in the OPE decomposition, given that it has already been demonstrated that the complexation of transition metal ions with PAM does not lower nucleophilicity of the latter. Mancin, F.; Tecilla, P.; Tonellato, U. "Metallomicelles Made of Ni(II) and Zn(II) Complexes of 2-Pyridinealdoxime-Based Ligands as Catalyst of the Cleavage of Carboxylic Acid Esters," *Langmuir* 2000, 16(1), 227-233.

An analogous rationale applies to the polymeric oxime, p(VPOx-AA), which was designed to model PAM by having a quaternized pyridinium group in close proximity to the aldoxime group, which can enhance the hydrolytic properties of the latter. Aglietto, M. et al. "Synthesis and catalytic activity of optically active polymers containing oxime groups," *Polymer* 1980, 21, 541-544. The p(VPOx-AA) can be viewed as a polymeric analog of phenyl-2-pyridyl ketoxime, that strongly associates with iron oxides. Reiner, D.; Poe, D. P. "Removal of iron, copper, cadmium, cobalt, and nickel from sodium hydroxide by precipitation and extraction with phenyl-2-pyridyl ketoxime," *Anal. Chem.* 1977, 49(6), 889-891. Furthermore, desirable is the presence of numerous carboxyl moieties that may chelate with iron ions embedded in the magnetite structure and impart charge to the magnetite surface, which charge is thought to improve the stability of the particles. Moeser, G. D.; Roach, K. A.; Green, W. H.; Laibinis, P. E.; Hatton, T. A. "Water-Based Magnetic Fluids as Extractants for Synthetic Organic Compounds," *Ind. Eng. Chem. Res.* 2002, 41(19), 4739-4749.

In another embodiment, polymers complexed or reacted with metal nanoparticles (as described herein) can comprise poly(N-vinylimidazole) and its copolymers and metal complexes. Kovach, I. M.; Bennet, A. J.; Bibbs, J. A.; Zhao, Q. "Nucleophilic and protolytic catalysis of phosphonate hydrolysis: isotope effects and activation parameters," *J. Am. Chem. Soc.* 1993, 115(12), 5138-5144; Chen, W.; Boven, G.; Challa, G. "Studies on immobilized polymer-bound imidazole-copper(II) complexes as catalysts. J. Immobilization of copper(II) complexes of poly(styrene-co-N-vinylimidazole) by grafting on silica and their catalysis of oxidative coupling of 2,6-disubstituted phenols," *Macromolecules* 1991, 24(14), 3982-3987; Kitano, H.; Sun, Z.; Ise, N. "Desolvation effects in the esterolysis catalyzed by imidazole-containing polymers," *Macromolecules* 1983, 16(12), 1823-1827; Shimidzu, T.; Chiba, H.; Yamazaki, K.; Minato, T. "Catalytic Properties of Poly(4(5)-vinylimidazole-co-acrylic acid) and Its Low Molecular Weight Analogues in the Hydrolyses of Various Substituted Phenyl Acetates," *Macromolecules* 1976, 9(4), 641-645; and Gagliano, R. A.; Knowlton, R. C.; Byers, L. D. "Methylimidazole-catalyzed ester hydrolysis: nonlinear kinetics," *J. Org. Chem.* 1989, 54(22), 5247-5250.

Characterization of Exemplary Compositions

Figure 3:
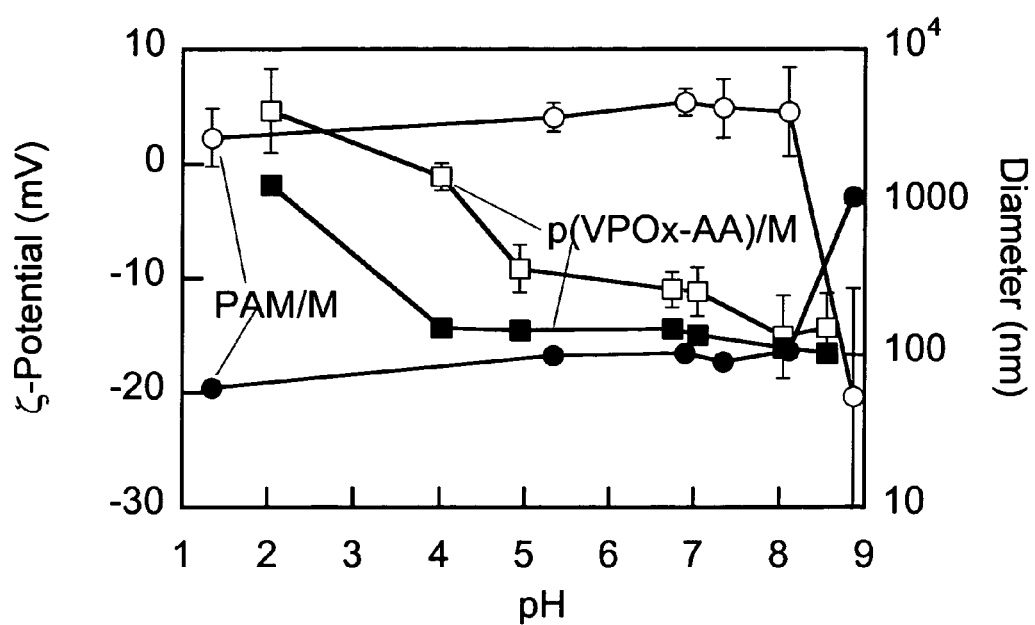
FIG. 3 depicts the effect of pH on ξ-potential and hydrodynamic diameter of magnetite particles modified with 2-pralidoxime (PAM/M) and poly(4-vinylpyridine-N-phenacyloxime-co-acrylic acid) [p(VPOX-AA)/M]. Open and filled points show ξ-potential and diameter, respectively. The temperature was 25° C.; and the buffer used was 10 mM Tris buffer with its pH adjusted by 1 M NaOH or HCl.

FIG. 3 shows the effects of pH on ξ-potential and hydrodynamic diameter of the magnetite particles modified by PAM or p(VPOx-AA) copolymer. The volume-average hydrodynamic diameter of the PAM/M and p(VPOx-AA)/M particle species was approximately 100 and 150 nm, respectively, in the pH range where the particles maintained colloidal stability. The number-average diameters of the PAM/M and p(VPOx-AA)/M particles in the pH 6-8 were in the range 25-35 and 55-65 nm, respectively. The PAM/M particles maintained weak positive charge due to the ionization of the 1-methylpyridinium groups until pH 8, above which point the PAM became unionized and the particles aggregated. The appearance of the negative ξ-potential on the aggregates at pH greater than 8 can be attributed to the exposed magnetite surfaces, which are negatively charged at these pH. Kim, D. K. et al. "Protective Coating of Superparamagnetic Iron Oxide Nanoparticles," *Chem. Mater.* 2003, 15(8), 1617-1627. The observed electrokinetic mobility pattern of the PAM/M particles corresponds well with the pKa=7.8 of PAM. Mancin, F.; Tecilla, P.; Tonellato, U.; "Metallomicelles Made of Ni(II) and Zn(II) Complexes of 2-Pyridinealdoxime-Based Ligands as Catalyst of the Cleavage of Carboxylic Acid Esters," *Langmuir* 2000, 16(1), 227-233.

The observed pH-dependencies of the electrokinetic mobility of the polymer-coated particles, p(VPOx-AA)/M, indicate an effect of the amphoteric nature of the copolymer, with its N-substituted 4-vinylpyridinium moieties positively charged at a pH less than or equal to about 8 and carboxyls of acrylic acid negatively charged at pH of about 4.6. That is, the particles maintained the overall negative charge at about pH 5, below which the carboxylic groups lost ionization, which lead to the particle aggregation. However, at pH less than or equal to about 8, the particles became more negatively charged overall, which can be attributed to both the loss of ionization of the 4-vinylpyridinium groups and the increased degree of ionization of the carboxyls. Electrostatic complexation between the carboxyls and 4-vinylpyridinium groups in the pH range of about 5 to about 8 is likely.

Further insight into the structure of the obtained particles was gained from the studies of their magnetization (SQUID experiments). The magnetization versus applied field curves of the oxime-modified magnetite particle suspensions were used to determine the size distribution of the $Fe_3O_4$ particles as described herein. The magnetic susceptibility yielded the diameter of the primary $Fe_3O_4$ particles to be about 7 to about 8 nm, in accord with the previously reported data on $Fe_3O_4$ modified by poly(acrylic acid) derivatives. Moeser, G. D.; Roach, K. A.; Green, W. H.; Laibinis, P. E.; Hatton, T. A. "Water-Based Magnetic Fluids as Extractants for Synthetic Organic Compounds," *Ind. Eng. Chem. Res.* 2002, 41(19), 4739-4749. When compared to the number-average diameter (see above), the obtained estimates of the size of the $Fe_3O_4$ clusters provide an estimate of the size of individual nanoparticles coated by the oxime-containing species. Note that the number-average distribution is less biased by the aggregate sizes than the volume average. By subtracting the median $Fe_3O_4$ diameter of about 8 nm from the number-average hydrodynamic diameters, we determined the thickness of the PAM and p(VPOx-AA) layers to be on the order of 10 and 25 nm, respectively. The thickness of the p(VPOx-AA) layer corresponded to the typical thicknesses of the layers of other polyelectrolytes on magnetite particles obtained via similar coprecipitation procedures. However, the estimate of the thickness layer of a low-molecular weight compound such as PAM which exceeds the size of an individual $Fe_3O_4$, suggests that under these conditions the primary magnetite particles form clusters.

Particles of the Invention

One aspect of the present invention relates to a particle having a diameter, comprising an inorganic metal oxide and a stabilizing compound, said stabilizing compound comprising a nucleophilic moiety; wherein said nucleophilic moiety is selected from the group consisting of alpha-nucleophiles, heteroatom-containing resonance-stabilized nucleophiles and n-nucleophiles; and said diameter is about 1 to about 1,000 nm.

Another aspect of the present invention relates to a particle having a diameter, consisting essentially of an inorganic metal oxide and a stabilizing compound, said stabilizing compound comprising a nucleophilic moiety; wherein said nucleophilic moiety is selected from the group consisting of alpha-nucleophiles, heteroatom-containing resonance-stabilized nucleophiles and n-nucleophiles; and said diameter is about 1 to about 1,000 nm.

In certain embodiments, the present invention relates to any of the aforementioned particles, wherein said nucleophilic moiety is selected from the group consisting of oximes, hydroxamic acids, enamines, aryloxides, and heteroaryloxides.

In certain embodiments, the present invention relates to any of the aforementioned particles, wherein said nucleophilic moiety is selected from the group consisting of oximes, hydroxamic acids, hydrazines, hydrazones, and sulfoxides.

In certain embodiments, the present invention relates to any of the aforementioned particles, wherein said nucleophilic moiety is selected from the group consisting of oximes and hydroxamic acids.

Another aspect of the present invention relates to a particle having a diameter, comprising an inorganic metal oxide and a stabilizing compound comprising a nucleophilic moiety; wherein said diameter is about 1 to about 1,000 nm; and said stabilizing compound comprising a nucleophilic moiety is represented by compound I or II:

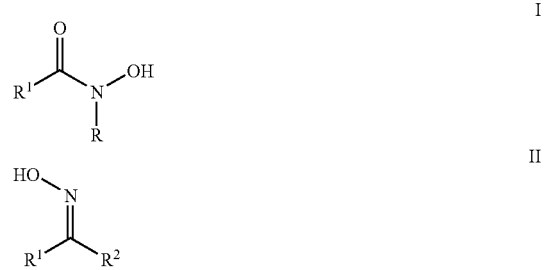

wherein, independently for each occurrence,
R is —C(=O)OR³, —C(=O)N(R³)₂, —C(=O)SR³, —C(=O)R³, —C(=NR)R³, —C(=S)R³, —C(R³)=C(R³)₂, —C≡CR³, —C—N, —[C(R³)₂]ₙ—R³, hydrogen, alkyl, cycloalkyl, heterocycloalkyl, cycloalkenyl, heterocycloalkenyl, aryl, or heteroaryl;
R¹ is —OR, —NR₂, —SR³, —C(=O)OR, —OC(=O)R, —NRC(=O)R, —C(=O)NR₂, —C(=O)SR, —SC(=O)R, —S(=O)R, —S(=O)$_2$R, —C(=O)R$^3$, —C(=NR)R$^3$, —C(=S)R$^3$, —C($^3$)=C(R$^3$)$_2$, —C≡CR$^3$, —C≡N, —[C(R$^3$)$_2$]$_n$—R, hydrogen, alkyl, cycloalkyl, heterocycloalkyl, cycloalkenyl, heterocycloalkenyl, aryl, or heteroaryl;

R$^2$ is —OR, —NR$^2$, —SR, —C(=O)OR, —OC(=O)R, —NRC(=O)R, —C(=O)NR$_2$, —C(=O)SR, —SC(=O)R, —S(=O)R, —S(=O)$_2$R, —C(=O)R$^3$, —C(=NR)R$^3$, —C(=S)R$^3$, —C(R$^3$)=C$^3$)$_2$, —C≡CR$^3$, —C≡N, —[C(R$^3$)$_2$]$_n$—R, hydrogen, halogen, alkyl, cycloalkyl, heterocycloalkyl, cycloalkenyl, heterocycloalkenyl, aryl, or heteroaryl;

R$^3$ is hydrogen, halogen, alkyl, cycloalkyl, heterocycloalkyl, alkenyl, cycloalkenyl, heterocycloalkenyl, alkynyl, cyano, aryl, or heteroaryl; and n is 0-10 inclusive.

Another aspect of the present invention relates to a particle having a diameter, consisting essentially of an inorganic metal oxide and a stabilizing compound comprising a nucleophilic moiety; wherein said diameter is about 1 to about 1,000 nm; and said stabilizing compound comprising a nucleophilic moiety is represented by compound I or II:

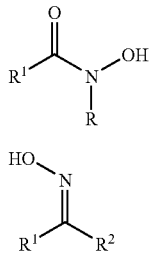

wherein, independently for each occurrence,

R is —C(=O)OR$^3$, —C(=O)N(R$^3$)$_2$, —C(=O)SR$^3$, —C(=O)R$^3$, —C(=NR$^3$)R$^3$, —C(=S)R$^3$, —C(R$^3$)=C(R$^3$)$_2$, —C≡CR$^3$, —[C(R$^3$)$_2$]—R$^3$, hydrogen, alkyl, cycloalkyl, heterocycloalkyl, cycloalkenyl, heterocycloalkenyl, aryl, or heteroaryl;

R$^1$ is —OR, —NR$_2$, —SR, —C(=O)OR, —OC(=O)R, —NRC(=O)R, —C(=O)NR$_2$, —C(=O)SR, —SC(=O)R, —S(=O)R, —S(=O)$_2$R, —C(=O)R$^3$, —C(=NR)R$^3$, —C(=S)R$^3$, —C(R$^3$)=C(R$^3$)$_2$, —C≡CR$^3$, —C≡N, —[C(R$^3$)$_2$]$_n$—R, hydrogen, alkyl, cycloalkyl, heterocycloalkyl, cycloalkenyl, heterocycloalkenyl, aryl, or heteroaryl;

R$^2$ is —OR, —NR$_2$, —SR, —C(=O)OR, —OC(=O)R, —NRC(=O)R, —C(=O)NR$_2$, —C(=O)SR, —SC(=O)R, —S(=O)R, —S(=O)$_2$R, —C(=O)R$^3$, —C(=NR)R$^3$, —C(=S)R$^3$, —C(R$^3$)=C(R$^3$)$_2$, —C≡CR$^3$, —C≡N, —[C(R$^3$)$_2$]$_n$—R, hydrogen, halogen, alkyl, cycloalkyl, heterocycloalkyl, cycloalkenyl, heterocycloalkenyl, aryl, or heteroaryl;

R$^3$ is hydrogen, halogen, alkyl, cycloalkyl, heterocycloalkyl, alkenyl, cycloalkenyl, heterocycloalkenyl, alkynyl, cyano, aryl, or heteroaryl; and n is 0-10 inclusive.

In certain embodiments, the present invention relates to any of the aforementioned particles, wherein said stabilizing compound comprising a nucleophilic moiety is represented by compound I.

In certain embodiments, the present invention relates to any of the aforementioned particles, wherein said stabilizing compound comprising a nucleophilic moiety is represented by compound II.

In certain embodiments, the present invention relates to any of the aforementioned particles, wherein said stabilizing compound comprising a nucleophilic moiety is represented by compound III, IV, V or VI:

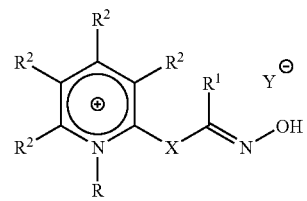

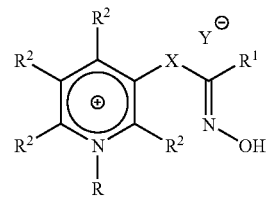

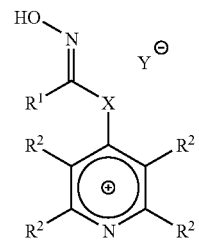

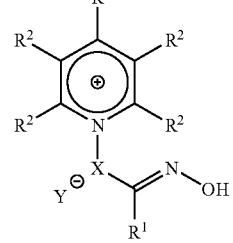

wherein, independently for each occurrence,

X is —[C(R$^3$)$_2$]$_n$—;

Y is Br, Cl, I, OMs, or OTf;

R is —C(=O)OR$^3$, —C(=O)N(R$^3$)$_2$, —C(=O)SR$^3$, —C(=O)R$^3$, —C(=NR$^3$)R$^3$, —C(=S)R$^3$, —C(R$^3$)=C(R$^3$)$_2$, —C≡CR$^3$, —[C(R$^3$)$_2$]$_p$—R$^3$, hydrogen, alkyl, cycloalkyl, heterocycloalkyl, cycloalkenyl, heterocycloalkenyl, aryl, or heteroaryl;

R$^1$ is hydrogen, alkyl, cycloalkyl, heterocycloalkyl, cycloalkenyl, heterocycloalkenyl, aryl, or heteroaryl;

R$^2$ is —OR, —NR$_2$, —SR, —C(=O)OR, —OC(=O)R, —NRC(=O)R, —C(=O)NR$_2$, —C(=O)SR, —SC(=O)R, —S(=O)R, —S(=O)$_2$R, —C(=O)R$^3$, —C(=NR)R$^3$, —C(=S)R$^3$, —C(R$^3$)=C(R$^3$)$_2$, —C≡CR$^3$, —C≡N, —[C(R$^3$)$_2$]$_p$—R, hydrogen, halogen, alkyl, cycloalkyl, heterocycloalkyl, cycloalkenyl, heterocycloalkenyl, aryl, or heteroaryl;

R$^3$ is hydrogen, halogen, alkyl, cycloalkyl, heterocycloalkyl, alkenyl, cycloalkenyl, heterocycloalkenyl, alkynyl, cyano, aryl, or heteroaryl;

n is 0-10 inclusive; and p is 0-10 inclusive.

In certain embodiments, the present invention relates to any of the aforementioned particles, wherein said stabilizing compound comprising a nucleophilic moiety is represented by compound III.

In certain embodiments, the present invention relates to any of the aforementioned particles, wherein said stabilizing compound comprising a nucleophilic moiety is represented by compound IV.

In certain embodiments, the present invention relates to any of the aforementioned particles, wherein said stabilizing compound comprising a nucleophilic moiety is represented by compound V.

In certain embodiments, the present invention relates to any of the aforementioned particles, wherein said stabilizing compound comprising a nucleophilic moiety is represented by compound VI.

In certain embodiments, the present invention relates to any of the aforementioned particles, wherein said stabilizing compound comprising a nucleophilic moiety is represented by compound VII, VIII or IX:

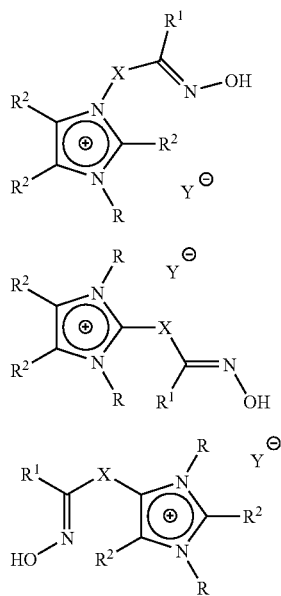

wherein, independently for each occurrence,

X is —[C($R^3$)$_2$]$_n$—;

Y is Br, Cl, I, OMs, or OTf;

R is —C(=O)O$R^3$, —C(=O)N($R^3$)$_2$, —C(=O)S$R^3$, —C(=O)$R^3$, —C(=N$R^3$)$R^3$, —C(=S)$R^3$, —C($R^3$)=C($R^3$)$_2$, —C≡C$R^3$, —[C($R^3$)$_2$]$_p$—$R^3$, hydrogen, alkyl, cycloalkyl, heterocycloalkyl, cycloalkenyl, heterocycloalkenyl, aryl, or heteroaryl;

$R^1$ is hydrogen, alkyl, cycloalkyl, heterocycloalkyl, cycloalkenyl, heterocycloalkenyl, aryl, or heteroaryl;

$R^2$ is —OR, —NR$_2$, —SR, —C(=O)OR, —OC(=O)R, —NRC(=O)R, —C(=O)NR$_2$, —C(=O)SR, —SC(=O)R, —S(=O)R, —S(=O)$_2$R, —C(=O)$R^3$, —C(=NR)$R^3$, —C(=S)$R^3$, —C($R^3$)=C($R^3$)$_2$, —C≡C$R^3$, —C≡N, —[C($R^3$)$_2$]$_p$—R, hydrogen, halogen, alkyl, cycloalkyl, heterocycloalkyl, cycloalkenyl, heterocycloalkenyl, aryl, or heteroaryl;

$R^3$ is hydrogen, halogen, alkyl, cycloalkyl, heterocycloalkyl, alkenyl, cycloalkenyl, heterocycloalkenyl, alkynyl, cyano, aryl, or heteroaryl;

n is 0-10 inclusive; and p is 0-10 inclusive.

In certain embodiments, the present invention relates to any of the aforementioned particles, wherein said stabilizing compound comprising a nucleophilic moiety is represented by compound VII.

In certain embodiments, the present invention relates to any of the aforementioned particles, wherein said stabilizing compound comprising a nucleophilic moiety is represented by compound VIII.

In certain embodiments, the present invention relates to any of the aforementioned particles, wherein said stabilizing compound comprising a nucleophilic moiety is represented by compound IX.

In certain embodiments, the present invention relates to any of the aforementioned particles, wherein n is 0.

In certain embodiments, the present invention relates to any of the aforementioned particles, wherein n is 1.

In certain embodiments, the present invention relates to any of the aforementioned particles, wherein n is 2-10 inclusive.

In certain embodiments, the present invention relates to any of the aforementioned particles, wherein n is 3-10 inclusive.

In certain embodiments, the present invention relates to any of the aforementioned particles, wherein n is 4-10 inclusive.

In certain embodiments, the present invention relates to any of the aforementioned particles, wherein n is 5-10 inclusive.

In certain embodiments, the present invention relates to any of the aforementioned particles, wherein Y is Br or I.

In certain embodiments, the present invention relates to any of the aforementioned particles, wherein R is alkyl.

In certain embodiments, the present invention relates to any of the aforementioned particles, wherein $R^1$ is aryl.

In certain embodiments, the present invention relates to any of the aforementioned particles, wherein $R^2$ is hydrogen.

In certain embodiments, the present invention relates to any of the aforementioned particles, wherein n is 0; and Y is Br or I.

In certain embodiments, the present invention relates to any of the aforementioned particles, wherein n is 0; Y is Br or I; and $R^2$ is hydrogen.

In certain embodiments, the present invention relates to any of the aforementioned particles, wherein n is 0; Y is Br or I; $R^2$ is hydrogen; and R is alkyl.

In certain embodiments, the present invention relates to any of the aforementioned particles, wherein n is 0; Y is Br or I; $R^2$ is hydrogen; and $R^1$ is aryl.

In certain embodiments, the present invention relates to any of the aforementioned particles, wherein n is 0; Y is Br or I; $R^2$ is hydrogen; R is alkyl; and $R^1$ is aryl.

In certain embodiments, the present invention relates to any of the aforementioned particles, wherein n is 0; X is Br; R is methyl; $R^1$ is phenyl; and $R^2$ is hydrogen.

Another aspect of the present invention relates to a particle having a diameter, comprising an inorganic metal oxide and a stabilizing compound comprising a nucleophilic moiety; wherein said diameter is about 1 to about 1,000 nm; and said stabilizing compound comprising a nucleophilic moiety is a polymer or co-polymer; wherein said polymer or co-polymer comprises a plurality of monomers represented by formula X:

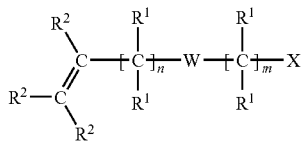

wherein, independently for each occurrence,

X is —C(=N—OH)—R³ or —C(=O)—N(R)—OH;

W is absent, —O—, —N(R)—, —S—, —C(=O)O—, —C(=O)N(R)—, —C(=O)S—, —S(=O)—, —S(=O)₂—, —C(R³)₂—, —C(=O)—, —C(=NR³)—, —C(=S)—, —C(R³)=C(R³)—, —C≡C—, -cycloalkyl-, -heterocycloalkyl-, -cycloalkenyl-, -heterocycloalkenyl-, -aryl-, or -heteroaryl-;

R is —C(=O)OR³, —C(=O)N(R³)₂, —C(=O)SR³, —C(=O)R³, —C(=NR³)R³, —C(=S)R³, —C(R³)=C(R³)₂, —C≡CR³, —[C(R³)₂]ₚ—R³, hydrogen, alkyl, cycloalkyl, heterocycloalkyl, cycloalkenyl, heterocycloalkenyl, aryl, or heteroaryl;

R¹ is —OR, —NR², —SR, —C(=O)OR, —OC(=O)R, —NRC(=O)R, —C(=O)NR₂, —C(=O)SR, —SC(=O)R, —S(=O)R, —S(=O)₂R, —C(=O)R³, —C(=NR)R³, —C(=S)R³, —C(R³)=C(R³)₂, —C≡CR³, —C≡N, —[C(R³)₂]ₚ—R, hydrogen, alkyl, cycloalkyl, heterocycloalkyl, cycloalkenyl, heterocycloalkenyl, aryl, or heteroaryl;

R² is hydrogen, halogen, alkyl, cycloalkyl, heterocycloalkyl, alkenyl, cycloalkenyl, heterocycloalkenyl, alkynyl, cyano, aryl, heteroaryl or —[C(R³)₂]ₚ—R;

R³ is hydrogen, halogen, alkyl, cycloalkyl, heterocycloalkyl, alkenyl, cycloalkenyl, heterocycloalkenyl, alkynyl, cyano, aryl, or heteroaryl; and n is 0-5 inclusive;

m is 0-5 inclusive; and p is 0-10 inclusive.

Another aspect of the present invention relates to a particle having a diameter, consisting essentially of an inorganic metal oxide and a stabilizing compound comprising a nucleophilic moiety; wherein said diameter is about 1 to about 1,000 nm; and said stabilizing compound comprising a nucleophilic moiety is a polymer or co-polymer; wherein said polymer or co-polymer comprises a plurality of monomers represented by formula X:

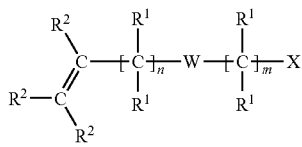

wherein, independently for each occurrence,

X is —C(=N—OH)—R³ or —C(=O)—N(R)—OH;

W is absent, —O—, —N(R)—, —S—, —C(=O)O—, —C(=O)N(R)—, —C(=O)S—, —S(=O)—, —S(=O)₂—, —C(R³)₂—, —C(=O)—, —C(=NR³)—, —C(=S)—, —C(R³)=C(R³)—, —C≡C—, -cycloalkyl-, -heterocycloalkyl-, -cycloalkenyl-, -heterocycloalkenyl-, -aryl-, or -heteroaryl-;

R is —C(=O)OR³, —C(=O)N(R³)₂, —C(=O)SR³, —C(=O)R³, —C(=NR³)R³, —C(=S)R³, —C(R³)=C(R³)₂, —C≡CR³, —[C(R³)₂]ₚ—R³, hydrogen, alkyl, cycloalkyl, heterocycloalkyl, cycloalkenyl, heterocycloalkenyl, aryl, or heteroaryl;

R¹ is —OR, —NR², —SR, —C(=O)OR, —OC(=O)R, —NRC(=O)R, —C(=O)NR₂, —C(=O)SR, —SC(=O)R, —S(=O)R, —S(=O)₂R, —C(=O)R³, —C(=NR)R³, —C(=S)R³, —C(R³)=C(R³)₂, —C≡CR³, —C≡N, —[C(R³)₂]ₚ—R, hydrogen, alkyl, cycloalkyl, heterocycloalkyl, cycloalkenyl, heterocycloalkenyl, aryl, or heteroaryl;

R² is hydrogen, halogen, alkyl, cycloalkyl, heterocycloalkyl, alkenyl, cycloalkenyl, heterocycloalkenyl, alkynyl, cyano, aryl, heteroaryl or —[C(R³)₂]ₚ—R;

R³ is hydrogen, halogen, alkyl, cycloalkyl, heterocycloalkyl, alkenyl, cycloalkenyl, heterocycloalkenyl, alkynyl, cyano, aryl, or heteroaryl; and n is 0-5 inclusive;

m is 0-5 inclusive; and p is 0-10 inclusive.

In certain embodiments, the present invention relates to any of the aforementioned particles, wherein X is —C(=N—OH)—R³.

In certain embodiments, the present invention relates to any of the aforementioned particles, wherein X is —C(=O)—N(R)—OH.

In certain embodiments, the present invention relates to any of the aforementioned particles, wherein R² is hydrogen or alkyl.

In certain embodiments, the present invention relates to any of the aforementioned particles, wherein R² is hydrogen.

In certain embodiments, the present invention relates to any of the aforementioned particles, wherein n is 0.

In certain embodiments, the present invention relates to any of the aforementioned particles, wherein n is 1.

In certain embodiments, the present invention relates to any of the aforementioned particles, wherein n is 2.

In certain embodiments, the present invention relates to any of the aforementioned particles, wherein n is 3.

In certain embodiments, the present invention relates to any of the aforementioned particles, wherein n is 4.

In certain embodiments, the present invention relates to any of the aforementioned particles, wherein n is 5.

In certain embodiments, the present invention relates to any of the aforementioned particles, wherein W is -heteroaryl-.

In certain embodiments, the present invention relates to any of the aforementioned particles, wherein W is

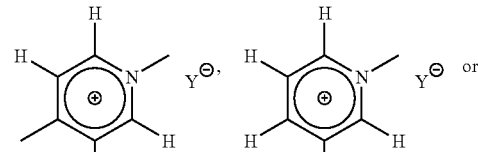

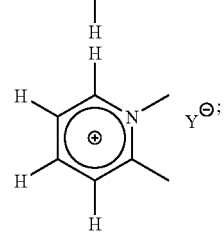

and Y is Br, Cl, I, OMs, or OTf.

In certain embodiments, the present invention relates to any of the aforementioned particles, wherein W is

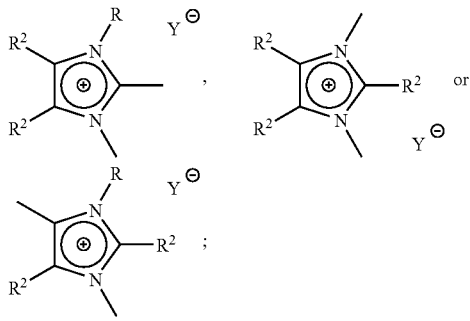

and Y is Br, Cl, I, OMs, or OTf.

In certain embodiments, the present invention relates to any of the aforementioned particles, wherein W is

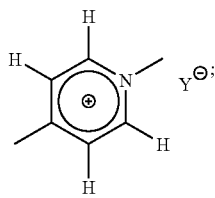

and Y is Br.

In certain embodiments, the present invention relates to any of the aforementioned particles, wherein W is

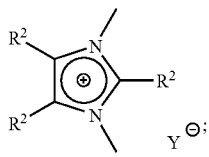

and Y is Br.

In certain embodiments, the present invention relates to any of the aforementioned particles, wherein m is 0.

In certain embodiments, the present invention relates to any of the aforementioned particles, wherein m is 1.

In certain embodiments, the present invention relates to any of the aforementioned particles, wherein m is 1.

In certain embodiments, the present invention relates to any of the aforementioned particles, wherein m is 2.

In certain embodiments, the present invention relates to any of the aforementioned particles, wherein m is 3.

In certain embodiments, the present invention relates to any of the aforementioned particles, wherein m is 4.

In certain embodiments, the present invention relates to any of the aforementioned particles, wherein m is 5.

In certain embodiments, the present invention relates to any of the aforementioned particles, wherein $R^1$ is hydrogen.

In certain embodiments, the present invention relates to any of the aforementioned particles, wherein $R^3$ is aryl.

In certain embodiments, the present invention relates to any of the aforementioned particles, wherein $R^3$ is phenyl.

In certain embodiments, the present invention relates to any of the aforementioned particles, wherein X is —C(=N—OH)—$R^3$; and $R^2$ is hydrogen.

In certain embodiments, the present invention relates to any of the aforementioned particles, wherein X is —C(=N—OH)—$R^3$; $R^2$ is hydrogen; and $R^1$ is hydrogen.

In certain embodiments, the present invention relates to any of the aforementioned particles, wherein X is —C(=N—OH)—$R^3$; $R^1$ is hydrogen; $R^1$ is hydrogen; and n is 0.

In certain embodiments, the present invention relates to any of the aforementioned particles, wherein X is —C(=N—OH)—$R^3$; $R^2$ is hydrogen; $R^1$ is hydrogen; n is 0; and m is 1.

In certain embodiments, the present invention relates to any of the aforementioned particles, wherein X is —C(=N—OH)—$R^3$; $R^2$ is hydrogen; $R^1$ is hydrogen; n is 0; m is 1; and $R^3$ is phenyl.

In certain embodiments, the present invention relates to any of the aforementioned particles, wherein X is —C(=N—OH)—$R^3$; $R^2$ is hydrogen; $R^1$ is hydrogen; n is 0; m is 1; $R^3$ is phenyl; W is

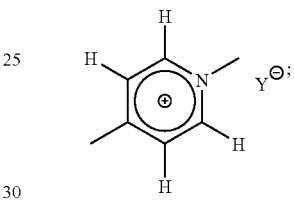

and Y is Br.

In certain embodiments, the present invention relates to any of the aforementioned particles, wherein said effective particle size is about 1 to about 500 nm.

In certain embodiments, the present invention relates to any of the aforementioned particles, wherein said effective particle size is about 1 to about 250 nm.

In certain embodiments, the present invention relates to any of the aforementioned particles, wherein said effective particle size is about 1 to about 100 nm.

In certain embodiments, the present invention relates to any of the aforementioned particles, wherein said effective particle size is about 5 to about 50 nm.

In certain embodiments, the present invention relates to any of the aforementioned particles, wherein said effective particle size is about 10 to about 25 nm.

In certain embodiments, the present invention relates to any of the aforementioned particles, wherein said inorganic metal oxide comprises at least one metal selected from the group consisting of Fe, Ru, Os, Co, Rh, Ir, Ni, Pd, Pt, Cu, Zn and Ni.

In certain embodiments, the present invention relates to any of the aforementioned particles, wherein said inorganic metal oxide comprises at least one metal selected from the group consisting of Fe, Cu, Zn and Ni.

In certain embodiments, the present invention relates to any of the aforementioned particles, wherein said inorganic metal oxide is an iron oxide.

In certain embodiments, the present invention relates to any of the aforementioned particles, wherein said inorganic metal oxide is $Fe_2O_3$ or $Fe_3O_4$.

In certain embodiments, the present invention relates to any of the aforementioned particles, wherein said inorganic metal oxide is $Fe_3O_4$.

In certain embodiments, the present invention relates to any of the aforementioned particles, wherein said composition is superparamagnetic.

Another aspect of the present invention relates to an article selected from the group consisting of filters, wipes, sponges, gas masks, membranes, wearable protective garments or air filtration systems; wherein said article comprises any one of the aforementioned particles.

Organophosphates

Organophosphates are rapidly absorbed by inhalation, ingestion and through the skin. The absorbed chemical as well as the active metabolite bind to the cholinesterase enzymes found in red blood cells and plasma. The binding to these enzymes leads to their inactivation and hence renders them incapable of degrading an important neurotransmitter, acetycholine. The excessive acetylcholine then accumulates at nerve junctions in the skeletal muscle system and in the autonomic and central nervous systems. With time, typically after 24 to 36 hours, this inactivation becomes irreversible.

Organophosphate esters are used as both insecticides and chemical warfare agents. Exemplary phosphate esters which can be hydrolyzed by the compositions and methods of the present invention are phosphates, phosphorofluoridates, phosphonates, and their sulfur analogs such as phosphorothionates. Exemplary organophosphate esters include parathion, malathion, diazinon, phosmet (Imidan®), chlorpyrifos (Lorsban®), sarin, tabun (ethylphosphorodimethylamidocyanidate), soman (plnacolyl methylphospphonerfluoridate), GF (Cyclohexyl methylphosphonofluoridate) and VX (ethyl S-2-diisopropyl aminoethyl methylphosphoro-thioate). Due to the toxicity of may organophosphates, such as those listed above, hydrolysis of a model OPE nerve agent, diisopropyl fluorophosphate (DFP), was used in the exemplification disclosed herein.

Catalytic Destruction of an Organophosphate by a Composition of the Invention

The compositions of the present invention can be use in processes for the decontamination of chemical warfare nerve agents and pesticides. In certain embodiments, the compositions will hydrolyze materials which contain either a phosphono-group or a phosphoro-group. One or both of the hydrolysis and adsorption properties can be employed in particular decontamination process depending upon the particular needs at the site of the decontamination.

Decontamination is accomplished simply by contacting one of the inventive compositions with the phosphate ester to adsorb and/or hydrolyze it. If a step of adsorption without hydrolysis is desired for a particular decontamination process, then a sufficient amount of said composition should be employed to adsorb substantially all of the phosphate ester. The proper amount of composition to be used in a particular cleanup can be determined by routine experimentation.

Figure 4:
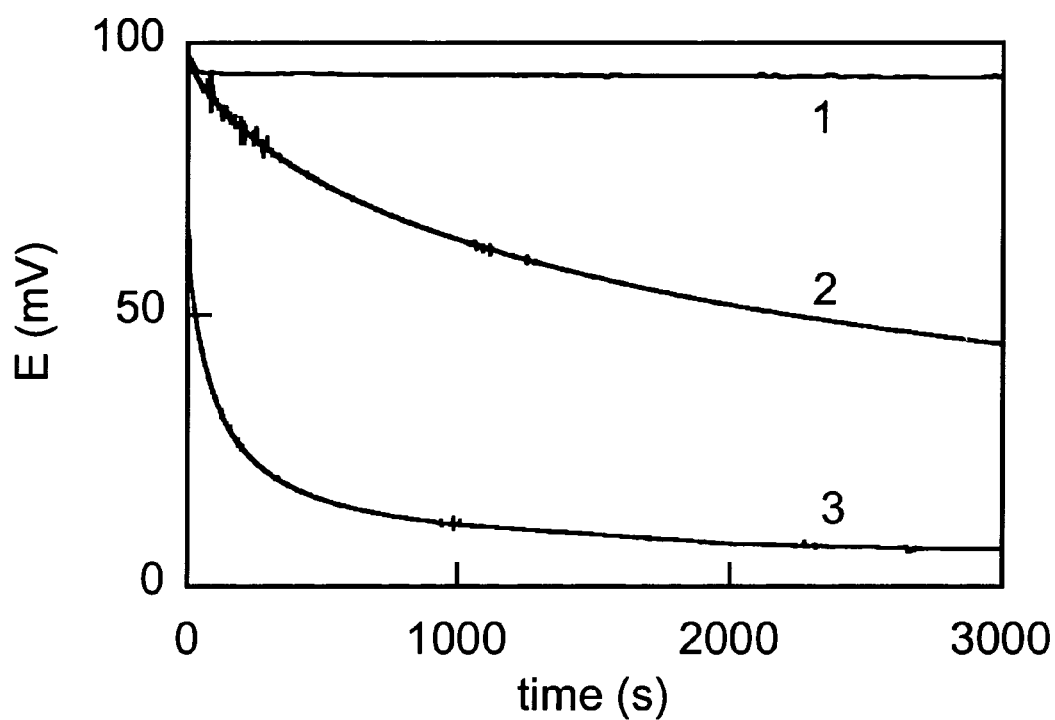
FIG. 4 depicts the potential-time response of fluoride-selective electrode to various DFP concentrations in the absence (1) and the presence (2, 3) of 1 mg/mL magnetite particles modified with PAM. DFP concentration is 0.54 mM (1, 2) or 2 mM (3). The temperature was 25° C.; and the buffer used was 10 mM Tris buffer at a pH of 7.0.

In one embodiment, hydrolysis of DFP producing fluoride ion may be monitored by the ion-selective fluoride electrode. FIG. 4. Since the electrode response time is only several seconds, whereas the generation of the fluoride ion as a byproduct of the DFP decomposition is significantly slower, the inherent response time of fluoride ion-selective electrode will have no apparent influence on determination of the hydrolysis rate. Xie, Y.; Popov, B. N. "Catalyzed Hydrolysis of Nerve Gases by Metal Chelate Compounds and Potentiometric Detection of the Byproducts," *Anal. Chem.* 2000, 72(9), 2075-2079.

For example, in the absence of the catalytic particles in the DFP solution in 10 mM Tris buffer, at a constant pH of about 7.0, the electrode potential was stable for at least 16 h, indicating negligible accumulation of fluoride ions. Addition of DFP to the suspension of oxime-containing particles resulted in rapid appearance and accumulation of fluoride ions, as is seen from the rather dramatic response of the ion-selective electrode.

Hydrolysis of the DFP and sarin in the presence of metal chelates has been established to be of the pseudo-first-order rate with respect to the total concentration of unreacted DFP:

$$-\frac{d[DFP]}{dt} = k_{obs}[DFP] \qquad [2]$$

where $k_{obs}$ is the observed pseudo-first-order rate constant. Courtney, R. C. et al. "Metal Chelate Compounds as Catalysts in the Hydrolysis of Isopropyl Methylphosphonofluoridate and Diisopropylphosphorofluoridate," *J. Am. Chem. Soc.* 1957, 79(12), 3030-3036; Wagner-Jauregg, T. et al. "Model Reactions of Phosphorus-containing Enzyme Inactivators. IV.1a The Catalytic Activity of Certain Metal Salts and Chelates in the Hydrolysis of Diisopropyl Fluorophosphate," *J. Am. Chem. Soc.* 1955, 77(4), 922-929; Xie, Y.; Popov, B. N. "Catalyzed Hydrolysis of Nerve Gases by Metal Chelate Compounds and Potentiometric Detection of the Byproducts," *Anal. Chem.* 2000, 72(9), 2075-2079; Gustafson, R. L.; Chaberek, S.C., Jr.; Martell, A. E. *J. Am. Chem. Soc.* 1963, 85, 598-601; Murakami, Y.; and Martell, A. E. *J. Am. Chem. Soc.* 1964, 86, 2119-212.

The initial slope of the $C_t$ vs t kinetic curves corresponds to the initial rate of the DFP hydrolysis ($v_o$). The observed rate constant of the DFP hydrolysis is obtained from the experimental data using the integrated form of eqn [3]:

$$-1n(1-C_t/[DFP]_o)=k_{obs}t \qquad [3]$$

The observed rate of the spontaneous DFP hydrolysis in the absence of particles or PAM in all our experiments conducted in 10 mM Tris buffer at pH 7.0 was negligibly small ($k_{obs}=7\times10^{-7}$ s$^{-1}$). For comparison reasons, a series of measurements was conducted under identical conditions on the DFP hydrolysis in the presence of up to 10 mg/mL of the particles.

Figure 5:
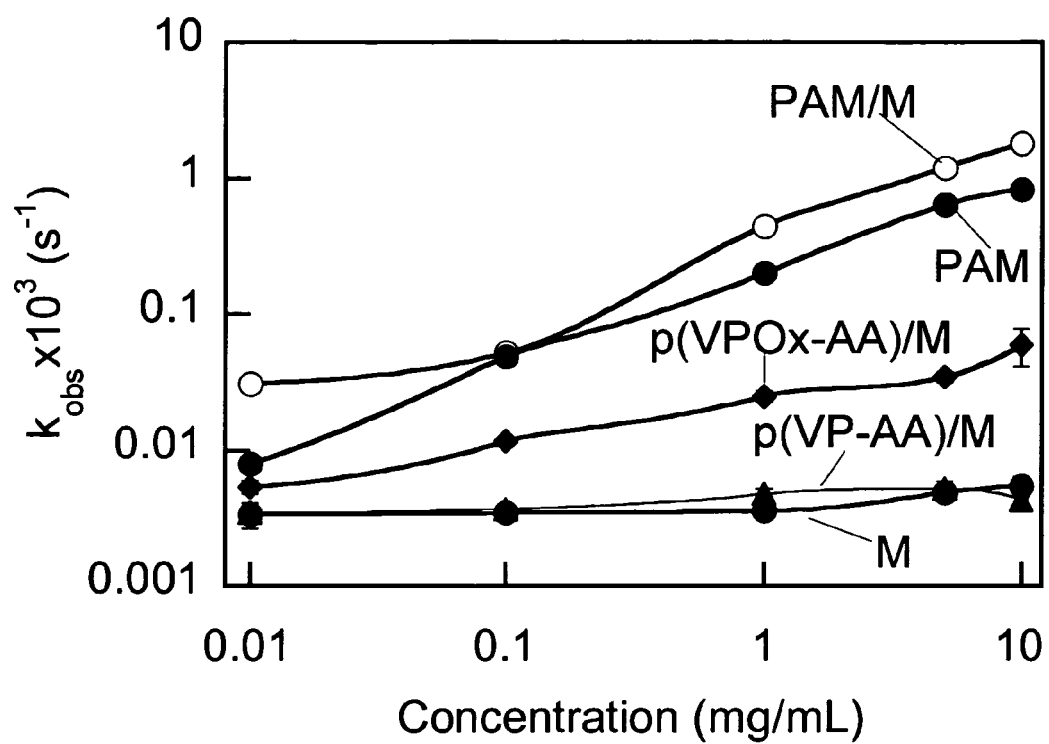
FIG. 5 depicts the observed kinetic constants ($k_{obs}$) of the DFP hydrolysis versus the effective concentration of additives (T=25° C.; pH 7.0; 10 mM Tris buffer). Designations M, PAM, PAM/M, p(VP-AA)/M, and p(VPOX-AA)/M stand for magnetite, 2-pralidoxime, and magnetite modified with pralidoxime, poly(4-vinylpyridine-co-acrylic acid), and poly(4-vinylpyridine-N-phenacyloxime-co-acrylic acid), respectively.

Without the oxime groups present, the hydrolysis occurred with rates exceeding that of the spontaneous hydrolysis up to 10-fold. Some hydrolytic activity of magnetite surface toward organophosphates has been previously reported [F. Tafesse; N. C. Deppa "Polymetallic complexes in microemulsions for the hydrolysis of 4-nitrophenyl phosphate: a bio-mimetic model for decontamination of organophosphates in the environment," *Ecotoxicology and Environmental Safety* 2004, 58(2), 260-266]; it may be related to the ability of the iron hydroxide groups present on the magnetite surface to participate in the nucleophilic substitution reactions [Elsner, M.; Schwarzenbach, R. P.; Kellerhals, T.; Luzi, S.; Zwank, L.; Angst, W.; Haderlein, S. B. "Mechanisms and Products of Surface-Mediated Reductive Dehalogenation of Carbon Tetrachloride by Fe(II) on Goethite," *Environ. Sci. Technol.* 2004, 38(7), 2058-2066]. However, it can be seen from FIG. 5 that the presence of the oxime groups dramatically enhanced the nucleophilicity of the magnetite surface with the rates of the DFP hydrolysis.

The hydrolysis of DFP or sarin by metal chelates or oximates proceeds via a formation of complexes that are unstable and easily hydrolyzed in water [R. C. Courtney; R. L. Gustafson; S. J. Westerback; H. Hyytiainen; S. C. Chaberek Jr.; A. E. Martell "Metal Chelate Compounds as Catalysts in the Hydrolysis of Isopropyl Methylphosphonofluoridate and Diisopropylphosphorofluoridate," *J. Am. Chem. Soc.* 1957, 79(12), 3030-3036; Snow, A.; Barger, W. R. "A chemical comparison of methanesulfonyl fluoride with organofluorophosphorus ester anticholinesterase compounds," *Chem. Res. Toxicol.* 1988, 1, 379-384; and Jandorf, B. J. "Chemical Reactions of Nerve Gases in Neutral Solution. I. Reactions with Hydroxylamine," *J. Am. Chem. Soc.* 1956, 78(15), 3686-3691]. Hence, the catalytic reaction between DFP and oxime-modified magnetite particles or PAM can be presented in FIG. 6.

Figure 6:
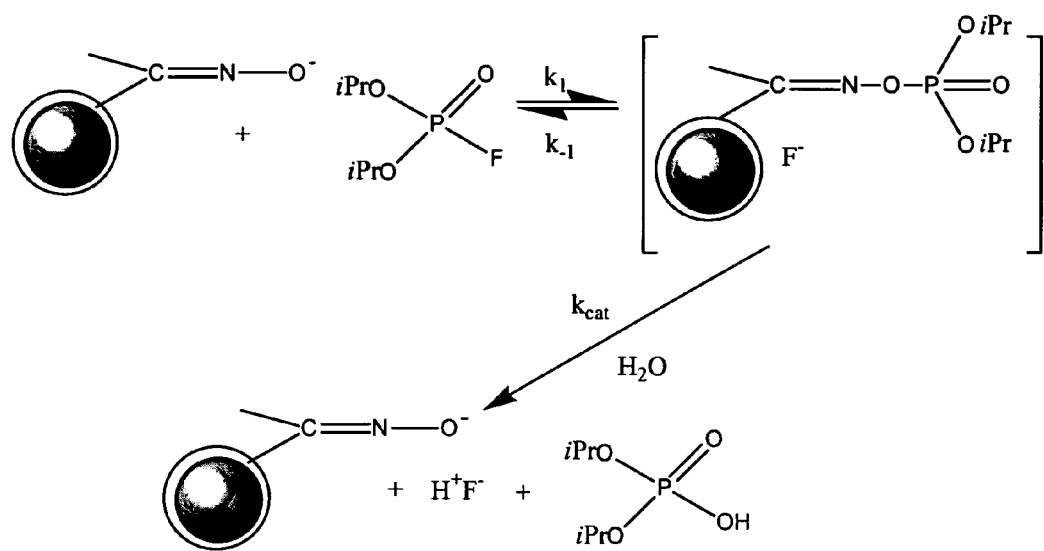
FIG. 6 depicts a postulated mechanism for the hydrolysis of DFP with oxime-modified particles.

According to FIG. 6, the rate law is given by:

$$v = \frac{dC_t}{dt} = \frac{k_{cat}[Ox][DFP]}{K_M + [DFP]} \quad [4]$$

where $$K_M = \frac{k_{-1} + k_{cat}}{k_1}$$

is the Michaelis constant, $k_{cat}$ is the catalytic rate constant, and [Ox] is the concentration of the catalytic (oxime) groups in the system.

Rearranging eqn [4] yields expressions for the $k_{cat}$ and $K_M$ that are convenient for treatment of the experimental data:

$$k_{cat} = A\frac{[DFP]_o}{K_M + [DFP]_o} \quad [5]$$

$$K_M = B(k_{cat}[Ox]_o - v_o) \quad [6]$$

where $A=[Ox]/\kappa_o$ is the slope obtained from $\kappa_o$ vs [Ox] plot at constant $[DFP]_o$, whereas $B=[DFP]/\kappa_o$ is the slope obtained from the $1/\kappa_o$ vs $1/[DFP]$, that is, Lineweaver-Burk plot at constant $[Ox]_o$.

Figure 7:
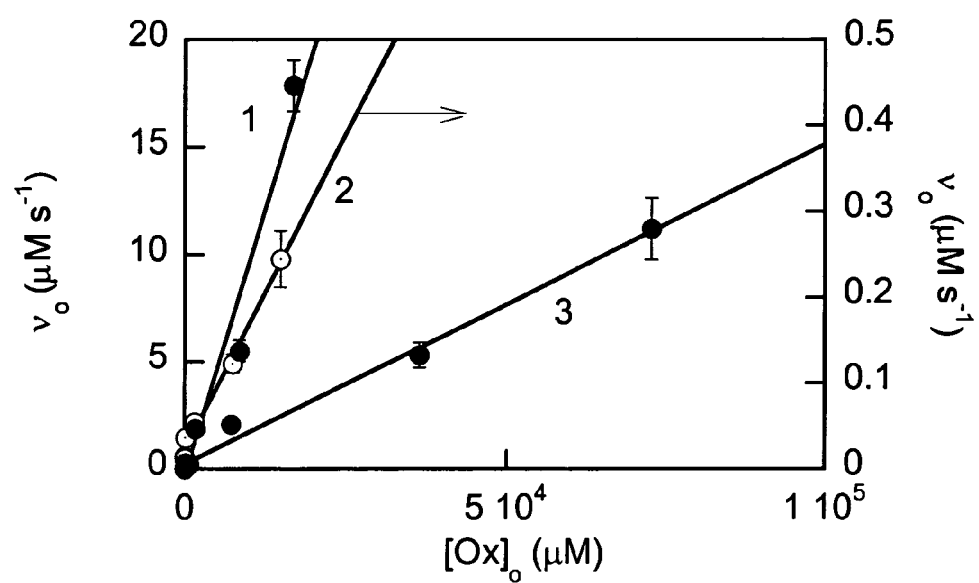
FIG. 7 depicts the initial rate of DFP hydrolysis ($v_o$) versus concentration of the oxime groups ($[Ox]_o$) in suspensions of magnetite modified with PAM (1) or p(VPOX-AA) (2) or solutions of PAM (3). $[DFP]_o$=4 mM, T=25° C., 10 mM Tris buffer, pH 7.0.
Figure 8:
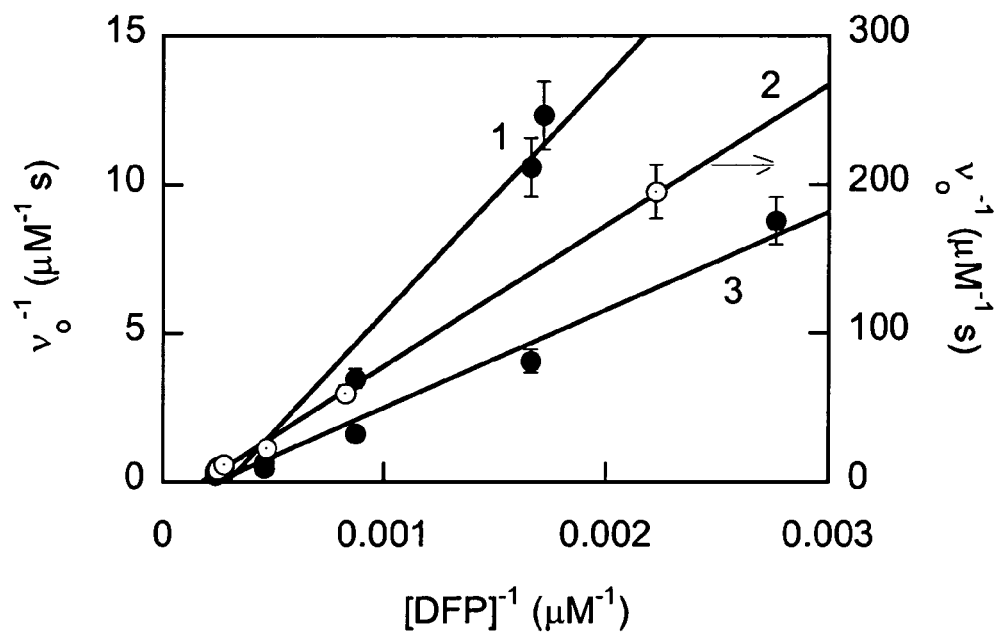
FIG. 8 depicts the Lineweaver-Burk plots of the initial rate of DFP hydrolysis ($1/\kappa_o$) versus initial DFP concentration ($1/[DFP]_o$) in suspensions of magnetite modified with PAM (1) or p(VPOX-AA) (2) or solutions of PAM (3). Initial oxime concentrations were 1.7, 7.3, and 1.5 μM on plots 1, 2, and 3, respectively. T=25° C., 10 mM Tris buffer, pH 7.0.
Figure 9:
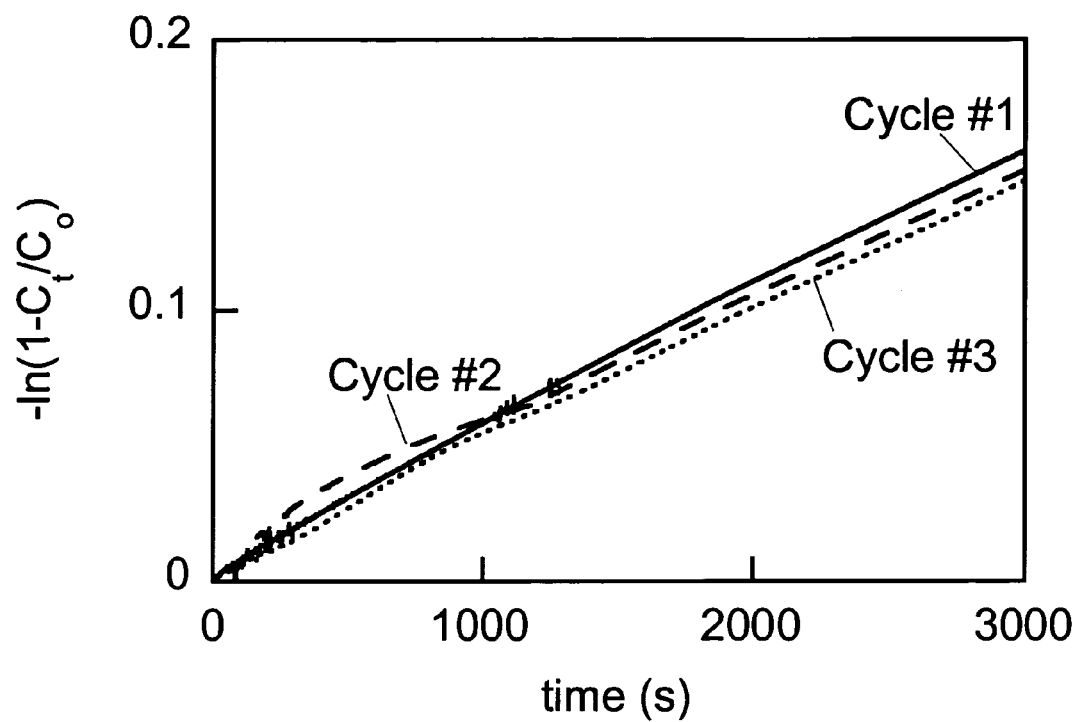
FIG. 9 depicts the effect of recycling on the performance of magnetite modified by p(VPOx-AA) in DFP hydrolysis (T=25° C.; pH 7.0; 10 mM Tris; initial DFP concentration in all cycles was 1.33 mM). Cycle #1 comprised the first use of the particles; cycle #2 comprised the first magnetic recovery and resuspension of the particles at 1 mg/mL; and cycle #3 comprised the second magnetic recovery and resuspension of the particles at 1 mg/mL. Solid lines show linear fits ($R^2$ greater than or equal to about 0.99 in all cases).

A linearity of the aforementioned plots, if observed, would lend a strong support to the mechanistic (enzyme-like) scheme (FIG. 6) and ensuing eqns [5] and [6]. We thus examined corresponding dependencies of the initial rate of the DFP hydrolysis using PAM and PAM- and p(VPOX-AA)-modified magnetite and the experimental results are depicted in FIGS. 7 and 8.

Linear fits were obtained in all cases ($R^2 > 0.97$), supporting relations (3) and (4) and enabling computation of the constants $k_{cat}$ and $K_M$. These constants, along with the second-order hydrolysis rate constant, $k''=\kappa_o/[Ox]_o[DFP]_o$, which, taken together, comprehensively characterize the observed catalytic hydrolysis of DFP, are collected in Table 1 (shown below).

TABLE 1

Michaelis constant ($K_M$), catalytic rate constant ($k_{cat}$) and second-order rate constant (k") found for the DFP hydrolysis in the presence of oxime-containing species, in 10 mM Tris buffer at pH 7.0.

| Species | $K_M \times 10^3$ (M) | $k_{cat} \times 10^4$ (s$^{-1}$) | k" (M$^{-1}$s$^{-1}$) |
|---|---|---|---|
| PAM/M | 2.5 ± 0.12 | 6.1 ± 0.37 | 0.29 ± 0.088 |
| PAM | 1.2 ± 0.057 | 1.2 ± 0.073 | 0.075 ± 0.051 |
| p(VPOx-AA)/M | 0.83 ± 0.040 | 0.12 ± 0.006 | 0.057 ± 0.018 |

Table 1 shows that the catalytic efficiency, $k_{cat}/K_M$, of the PAM-modified magnetite suspensions were about 2.5-fold higher than of the PAM solutions without magnetite. This interesting finding clearly points to the higher catalytic activity of the iron chelate compared to the oxime itself; an effect that has not been previously reported with magnetite-complexed PAM. Enhanced hydrolytic activity of $Cu^{2+}$, $Ni^{2+}$, or $Zn^{2+}$ complexes with oximes compared to the oximes themselves has been described previously. R. Breslow; D. Chipman "Mixed Metal Complexes as Enzyme Models. I. Intracomplex Nucleophilic Catalysis by an Oxime Anion," *J. Am. Chem. Soc.* 1965, 87(18), 4195-4196; and Mancin, F.; Tecilla, P.; Tonellato, U. "Metallomicelles Made of Ni(II) and Zn(II) Complexes of 2-Pyridinealdoxime-Based Ligands as Catalyst of the Cleavage of Carboxylic Acid Esters," *Langmuir* 2000, 16(1), 227-233. The kinetic constants measured with PAM/M were comparable to or higher than those with Cu(II)-bipyridyl complexes thus far believed to be the most catalytically active, indicating the potential utility for the nerve agent decomposition. Xie, Y.; Popov, B. N. "Catalyzed Hydrolysis of Nerve Gases by Metal Chelate Compounds and Potentiometric Detection of the Byproducts," *Anal. Chem.* 2000, 72(9), 2075-2079.

The hydrolysis catalyzed by the polymer-modified particles, p(VPOx-AA)/M, proceeded with 17-fold and 7-fold lesser catalytic efficiency than with PAM/M particles or PAM solutions, respectively. The DFP hydrolysis with the p(VPOx-AA)/M particles was about 2-fold faster than in the US Army report on that process catalyzed by the Cu(II) complex of poly(4-vinylpyridine), quaternized with ethyl bromide and 4-choloromethyl-4'-methyl-2,2'-bipyridine at pH 7.0 and 25° C. Hammond, P. S.; Forster, J. S. "A polymeric amine-copper (II) complex as catalyst for the hydrolysis of 1,2,2-trimethylpropyl methylphosphonofluoridate (Soman) and bis(1-methylethyl)phosphorofluoridate (DFP)," *J. Appl. Polym. Sci.* 1991, 43, 1925-1931. Catalytic activity of the oxime groups, which depends on their ability to generate the oximate anion (an active species in the nucleophilic attack on the phosphorus electrophilic centers), tends to increase with the oxime compound's $pK_a$. Buncel, E.; Cannes, C.; Chatrousse, A.-P.; Terrier, F. "Reactions of Oximate α-Nucleophiles with Esters: Evidence from Solvation Effects for Substantial Decoupling of Desolvation and Bond Formation," *J. Am. Chem. Soc.* 2002, 124(30), 8766-8767. That is, the greater the affinity of the oximate anion for a proton, the greater its reactivity with the phosphoryl center of the OP. In this regard, the oximate activity in p(VPOx-AA)/M particles, with their apparent $pK_a$ below 5, should be expected to be lower than in PAM/M, with their $pK_a$ at or above 8.0. In addition, the oximate accessibility toward the substrate (DFP), can be lower in the layers of the p(VPOx-AA) polymer compared to the low molecular weight compound (PAM).

Recycling of the Catalytic Particles

Advantage can be taken of the superparamagnetic properties of the magnetite particles to separate the catalyst from the reaction medium following use, allowing multiple uses.

Magnetic fluids have been applied to many different biological systems independently to separate cells (Safarik, I.; Safarikova, M. *J. Chromatogr. B* 1999, 722, 33-53) and proteins (Bucak, S. et al., *Biotechnol. Prog.* 2003, 19, 477-484; Hubbuch, J. J. et al., *Biotechnol. Bioeng.* 2002, 79, 301-313; Tong, X. D. et al., *Biotechnol. Prog.* 2001, 17, 134-139; Khng, H. P. et al., *Biotechnol. Bioeng.* 1998, 60, 419-424; DeCuyper, M. et al., *Biotechnol. Bioeng.* 1996, 49, 654-658). In most biological separation applications, the magnetic nanoparticles are used as tagging-agents for the biological species of interest, which usually has a negligible magnetic moment. The same approach to separating magnetic nanopaticles has been used in the instant invention.

Recovery of the nanoparticles from the aqueous solutions was achieved in a series of magnetic filtration experiments in which a suspension of the particles that had participated in the DFP hydrolysis was passed through the HGMS filter with the magnet on, and the particles trapped in the filter were recovered by removing the column from the magnet and passing fresh water through the filter; this cycle of the DFP hydrolysis, filtration and collection processes was then repeated twice as described in the exemplification section. The effect of recycling on the ability of the p(VPOx-AA)/M particles to catalyze the DFP hydrolysis is depicted in FIG. 8. The observed kinetic constants of the DFP hydrolysis with the PAM/M and p(VPOx-AA)/M particle species were determined in three cycles to be $(19.9\pm1.33)\times10^{-5}$ and $(50.2\pm2.3)\times10^{-6}$ s$^{-1}$, respectively, indicating that within less than 7% of error, no deterioration in the particle performance was observed. In addition, the SQUID measurements showed magnetization of the recovered particles identical to the original particles, within 5% of error, which suggests that the particles are stable under conditions of the DFP hydrolysis.

Methods of the Invention

One aspect of the present invention relates to a method of making a particle having a diameter, the method comprising the steps of precipitating at least one inorganic metal salt in the presence of a stabilizing compound, said stabilizing compound comprising a nucleophilic moiety, to form a pre-particle; and oxidizing said pre-particle with an oxidizing agent to form said particle; wherein said nucleophilic moiety is selected from the group consisting of alpha-nucleophiles, heteroatom-containing resonance stabilized nucleophiles and n-nucleophiles; and said diameter is about 1 to about 1,000 nm.

Another aspect of the present invention relates to a method of making a particle in a microemulsion system with an internal structure consisting of small droplets, comprising the steps of forming a first microemulsion comprising nanosized compartments made up of hydrophilic moieties of the surfactant filled with water; wherein the hydrophilic interior of these droplets contain at least one transition metal salt; adding a second microemulsion comprising nanosized compartments made up of hydrophilic moieties of the surfactant filled with water; wherein the hydrophilic interior of these droplets contain an amount of a precipitating agent; or adding the precipitating agent directly to the first microemulsion containing the metal precursor; thereby forming a particle with a diameter; and associating with said particle a nucleophilic stabilizing compound.

Another aspect of the invention relates to the method of making a particle comprising at least one inorganic metal salt and a stabilizing compound, said stabilizing compound comprising a nucleophilic moiety, via controlled surface-graft polymerization; heterocoagulation; sol-gel co-condensation or dispersed phase polymerization processes; the self-assembly of amphiphilic or water-insoluble low molecular weight or polymeric molecules; or a one-pot sequential or simultaneous two-fold polymerization processes (e.g., free-radical and sol-gel).

Another aspect of the invention relates to the method of making a particle comprising at least one inorganic metal salt and a stabilizing compound, said stabilizing compound comprising a nucleophilic moiety, in the gas phase based on homogeneous nucleation in the gas phase and subsequent condensation and coagulation.

In certain embodiments, the present invention relates to any of the aforementioned methods, wherein said nucleophilic moiety is selected from the group consisting of oximes, hydroxamic acids, enamines, aryloxides, and heteroaryloxides.

In certain embodiments, the present invention relates to any of the aforementioned methods, wherein said nucleophilic moiety is selected from the group consisting of oximes, hydroxamic acids, hydrazines, hydrazones, and sulfoxides.

In certain embodiments, the present invention relates to any of the aforementioned methods, wherein said nucleophilic moiety is selected from the group consisting of oximes and hydroxamic acids.

Another aspect of the present invention relates to the aforementioned methods of making a particle having a diameter; wherein said diameter is about 1 to about 1,000 nm; and said stabilizing compound comprising a nucleophilic moiety is represented by compound I or II:

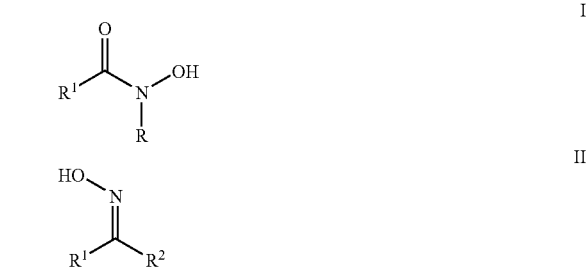

wherein, independently for each occurrence,

R is —C(=O)OR$^3$, —C(=O)N(R$^3$)$_2$, —C(=O)SR$^3$, —C(=O)R$^3$, —C(=NR)R$^3$, —C(=S)R$^3$, —C(R$^3$)=C(R$^3$)$_2$, —C≡CR$^3$, —C≡N, —[C(R$^3$)$_2$]$_n$—R$^3$, hydrogen, alkyl, cycloalkyl, heterocycloalkyl, cycloalkenyl, heterocycloalkenyl, aryl, or heteroaryl;

R$^1$ is —OR, —NR$^2$, —SR, —C(=O)OR, —OC(=O)R, —NRC(=O)R, —C(=O)NR$_2$, —C(=O)SR, —SC(=O)R, —S(=O)R, —S(=O)$_2$R, —C(=O)R$^3$, —C(=NR)R$^3$, —C(=S)R$^3$, —C(R$^3$)=C(R$^3$)$_2$, —C≡CR$^3$, —C≡N, —[C(R$^3$)$_2$]$_n$—R, hydrogen, alkyl, cycloalkyl, heterocycloalkyl, cycloalkenyl, heterocycloalkenyl, aryl, or heteroaryl;

R$^2$ is —OR, —NR$^2$, —SR, —C(=O)OR, —OC(=O)R, —NRC(=O)R, —C(=O)NR$_2$, —C(=O)SR, —SC(=O)R, —S(=O)R, —S(=O)$_2$R, —C(=O)R$^3$, —C(=NR)R$^3$, —C(=S)R$^3$, —C(R$^3$)=C(R$^3$)$_2$, —C≡CR$^3$, —C≡N, —[C(R$^3$)$_2$]$_n$—R, hydrogen, halogen, alkyl, cycloalkyl, heterocycloalkyl, cycloalkenyl, heterocycloalkenyl, aryl, or heteroaryl;

R$^3$ is hydrogen, halogen, alkyl, cycloalkyl, heterocycloalkyl, alkenyl, cycloalkenyl, heterocycloalkenyl, alkynyl, cyano, aryl, or heteroaryl; and n is 0-10 inclusive.

In certain embodiments, the present invention relates to any of the aforementioned methods, wherein said stabilizing compound comprising a nucleophilic moiety is represented by compound I.

In certain embodiments, the present invention relates to any of the aforementioned methods, wherein said stabilizing compound comprising a nucleophilic moiety is represented by compound II.

In certain embodiments, the present invention relates to any of the aforementioned methods, wherein said stabilizing compound comprising a nucleophilic moiety is represented by compound III, IV, V or VI:

In certain embodiments, the present invention relates to any of the aforementioned methods, wherein said stabilizing compound comprising a nucleophilic moiety is represented by compound III.

In certain embodiments, the present invention relates to any of the aforementioned methods, wherein said stabilizing compound comprising a nucleophilic moiety is represented by compound IV.

In certain embodiments, the present invention relates to any of the aforementioned methods, wherein said stabilizing compound comprising a nucleophilic moiety is represented by compound V.

In certain embodiments, the present invention relates to any of the aforementioned methods, wherein said stabilizing compound comprising a nucleophilic moiety is represented by compound VI.

In certain embodiments, the present invention relates to any of the aforementioned methods, wherein said stabilizing compound comprising a nucleophilic moiety is represented by compound VII, VIII or IX:

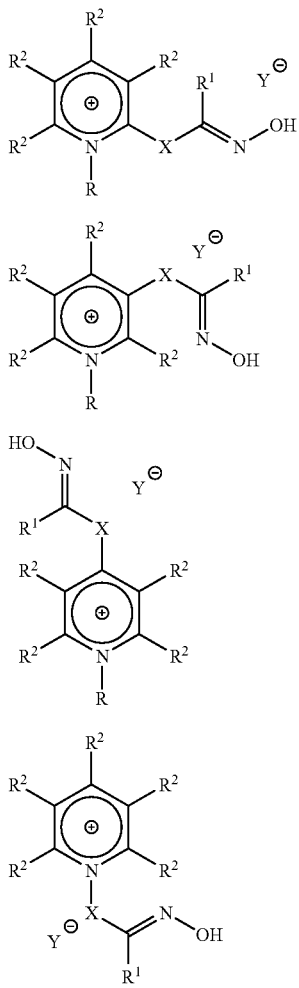

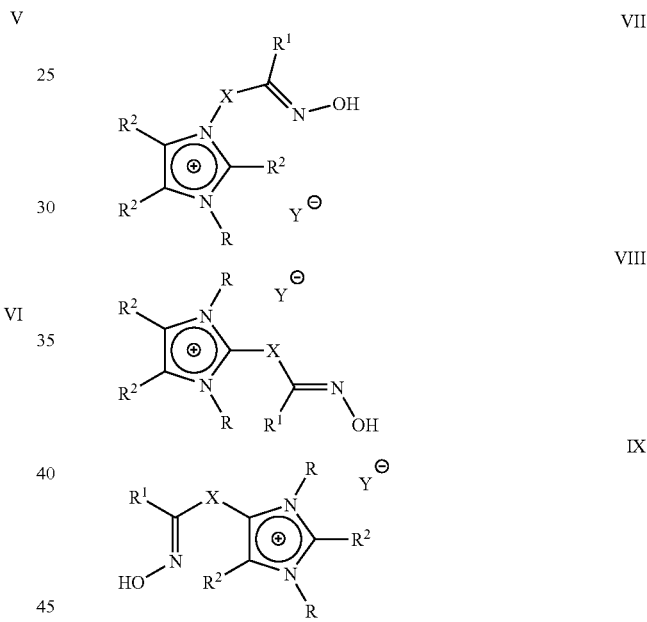

wherein, independently for each occurrence,

X is —[C(R³)₂]ₙ—;

Y is Br, Cl, I, OMs, or OTf;

R is —C(=O)OR³, —C(=O)N(R³)₂, —C(=O)SR³, —C(=O)R³, —C(=NR³)R³, —C(=S)R³, —C(R³)=C(R³)₂, —C≡CR³, —[C(R³)₂]ₚ—R³, hydrogen, alkyl, cycloalkyl, heterocycloalkyl, cycloalkenyl, heterocycloalkenyl, aryl, or heteroaryl;

R¹ is hydrogen, alkyl, cycloalkyl, heterocycloalkyl, cycloalkenyl, heterocycloalkenyl, aryl, or heteroaryl;

R² is —OR, —NR₂, —SR, —C(=O)OR, —OC(=O)R, —NRC(=O)R, —C(=O)NR₂, —C(=O)SR, —SC(=O)R, —S(=O)R, —S(=O)₂R, —C(=O)R³, —C(=NR)R³, —C(=S)R³, —C(R³)=C(R³)₂, —C≡CR³, —C≡N, —[C(R³)₂]ₚ—R, hydrogen, halogen, alkyl, cycloalkyl, cycloalkenyl, heterocycloalkenyl, aryl, or heteroaryl;

R³ is hydrogen, halogen, alkyl, cycloalkyl, heterocycloalkyl, alkenyl, cycloalkenyl, heterocycloalkenyl, alkynyl, cyano, aryl, or heteroaryl;

n is 0-10 inclusive; and p is 0-10 inclusive.

wherein, independently for each occurrence,

X is —[C(R³)₂]ₙ—;

Y is Br, Cl, I, OMs, or OTf;

R is —C(=O)OR³, —C(=O)N(R³)₂, —C(=O)SR³, —C(=O)R³, —C(=NR³)R³, —C(=S)R³, —C(R³)=C(R³)₂, —C≡CR³, —[C(R³)₂]ₚ—R³, hydrogen, alkyl, cycloalkyl, heterocycloalkyl, cycloalkenyl, heterocycloalkenyl, aryl, or heteroaryl;

R¹ is hydrogen, alkyl, cycloalkyl, heterocycloalkyl, cycloalkenyl, heterocycloalkenyl, aryl, or heteroaryl;

R² is —OR, —NR², —SR, —C(=O)OR, —OC(=O)R, —NRC(=O)R, —C(=O)NR₂, —C(=O)SR, —SC(=O)R, —S(=O)R, —S(=O)₂R, —C(=O)R³, —C(=NR)R³, —C(=S)R³, —C(R³)=C(R³)₂, —C≡CR³, —C≡N, —[C(R³)₂]ₚ—R, hydrogen, halogen, alkyl, cycloalkyl, heterocycloalkyl, cycloalkenyl, heterocycloalkenyl, aryl, or heteroaryl;

R³ is hydrogen, halogen, alkyl, cycloalkyl, heterocycloalkyl, alkenyl, cycloalkenyl, heterocycloalkenyl, alkynyl, cyano, aryl, or heteroaryl;

n is 0-10 inclusive; and p is 0-10 inclusive.

In certain embodiments, the present invention relates to any of the aforementioned methods, wherein said stabilizing compound comprising a nucleophilic moiety is represented by compound VII.

In certain embodiments, the present invention relates to any of the aforementioned methods, wherein said stabilizing compound comprising a nucleophilic moiety is represented by compound VIII.

In certain embodiments, the present invention relates to any of the aforementioned methods, wherein said stabilizing compound comprising a nucleophilic moiety is represented by compound IX.

In certain embodiments, the present invention relates to any of the aforementioned methods, wherein n is 0.

In certain embodiments, the present invention relates to any of the aforementioned methods, wherein n is 1.

In certain embodiments, the present invention relates to any of the aforementioned methods, wherein n is 2-10 inclusive.

In certain embodiments, the present invention relates to any of the aforementioned methods, wherein n is 3-10 inclusive.

In certain embodiments, the present invention relates to any of the aforementioned methods, wherein n is 4-10 inclusive.

In certain embodiments, the present invention relates to any of the aforementioned methods, wherein n is 5-10 inclusive.

In certain embodiments, the present invention relates to any of the aforementioned methods, wherein Y is Br or I.

In certain embodiments, the present invention relates to any of the aforementioned methods, wherein R is alkyl.

In certain embodiments, the present invention relates to any of the aforementioned methods, wherein $R^1$ is aryl.

In certain embodiments, the present invention relates to any of the aforementioned methods, wherein $R^2$ is hydrogen.

In certain embodiments, the present invention relates to any of the aforementioned methods, wherein n is 0; and Y is Br or I.

In certain embodiments, the present invention relates to any of the aforementioned methods, wherein n is 0; Y is Br or I; and $R^2$ is hydrogen.

In certain embodiments, the present invention relates to any of the aforementioned methods, wherein n is 0; Y is Br or I; $R^2$ is hydrogen; and R is alkyl.

In certain embodiments, the present invention relates to any of the aforementioned methods, wherein n is 0; Y is Br or I; $R^2$ is hydrogen; and $R^1$ is aryl.

In certain embodiments, the present invention relates to any of the aforementioned methods, wherein n is 0; Y is Br or I; $R^2$ is hydrogen; R is alkyl; and $R^1$ is aryl.

In certain embodiments, the present invention relates to any of the aforementioned methods, wherein n is 0; X is Br; R is methyl; $R^1$ is phenyl; and $R^2$ is hydrogen.

Another aspect of the present invention relates to the aforementioned methods of making a particle having a diameter, wherein said polymer or co-polymer comprises a plurality of monomers represented by formula X:

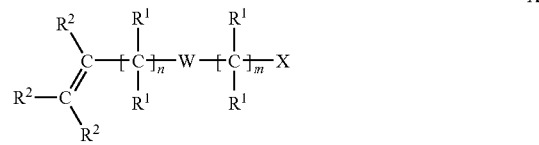

wherein, independently for each occurrence,

X is —C(=N—OH)—$R^3$ or —C(=O)—N(R)—OH;

W is absent, —O—, —N(R)—, —S—, —C(=O)O—, —C(=O)N(R)—, —C(=O)S—, —S(=O)—, —S(=O)$_2$—, —C($R^3$)$_2$—, —C(=O)—, —C(=N$R^3$)—, —C(=S)—, —C($R^3$)=C($R^3$)—, —C≡C—, -cycloalkyl-, -heterocycloalkyl-, -cycloalkenyl-, -heterocycloalkenyl-, -aryl-, or -heteroaryl-;

R is —C(=O)O$R^3$, —C(=O)N($R^3$)$_2$, —C(=O)S$R^3$, —C(=O)$R^3$, —C(=N$R^3$)$R^3$, —C(=S)$R^3$, —C($R^3$)=C($R^3$)$_2$, —C≡C$R^3$, —[C($R^3$)$_2$]$_p$—$R^3$, hydrogen, alkyl, cycloalkyl, heterocycloalkyl, cycloalkenyl, heterocycloalkenyl, aryl, or heteroaryl;

$R^1$ is —OR, —N$R^2$, —SR, —C(=O)OR, —OC(=O)R, —NRC(=O)R, —C(=O)N$R_2$, —C(=O)SR, —SC(=O)R, —S(=O)R, —S(=O)$_2$R, —C(=O)$R^3$, —C(=NR)$R^3$, —C(=S)$R^3$, —C$^3$)=C($R^3$)$_2$, —C≡C$R^3$, —C≡N, —[C($R^3$)$_2$]$_p$—R, hydrogen, alkyl, cycloalkyl, heterocycloalkyl, cycloalkenyl, heterocycloalkenyl, aryl, or heteroaryl;

$R^2$ is hydrogen, halogen, alkyl, cycloalkyl, heterocycloalkyl, alkenyl, cycloalkenyl, heterocycloalkenyl, alkynyl, cyano, aryl, heteroaryl or -[C($R^3$)$_2$]$_p$—R;

$R^3$ is hydrogen, halogen, alkyl, cycloalkyl, heterocycloalkyl, alkenyl, cycloalkenyl, heterocycloalkenyl, alkynyl, cyano, aryl, or heteroaryl; and n is 0-5 inclusive;

m is 0-5 inclusive; and p is 0-10 inclusive.

In certain embodiments, the present invention relates to any of the aforementioned methods, wherein X is —C(=N—OH)—$R^3$.

In certain embodiments, the present invention relates to any of the aforementioned methods, wherein X is —C(=O)—N(R)—OH.

In certain embodiments, the present invention relates to any of the aforementioned methods, wherein $R^2$ is hydrogen or alkyl.

In certain embodiments, the present invention relates to any of the aforementioned methods, wherein $R^2$ is hydrogen.

In certain embodiments, the present invention relates to any of the aforementioned methods, wherein n is 0.

In certain embodiments, the present invention relates to any of the aforementioned methods, wherein n is 1.

In certain embodiments, the present invention relates to any of the aforementioned methods, wherein n is 2.

In certain embodiments, the present invention relates to any of the aforementioned methods, wherein n is 3.

In certain embodiments, the present invention relates to any of the aforementioned methods, wherein n is 4.

In certain embodiments, the present invention relates to any of the aforementioned methods, wherein n is 5.

In certain embodiments, the present invention relates to any of the aforementioned methods, wherein W is -heteroaryl-.

In certain embodiments, the present invention relates to any of the aforementioned methods, wherein W is

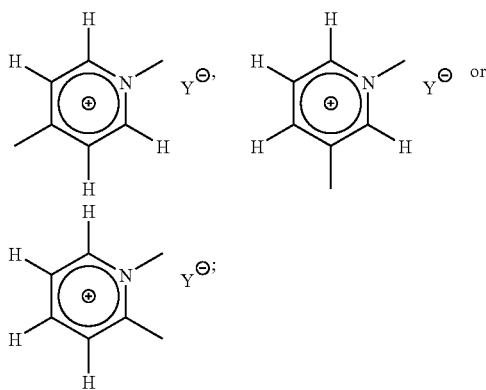

and Y is Br, Cl, I, OMs, or OTf.

In certain embodiments, the present invention relates to any of the aforementioned methods, wherein W is

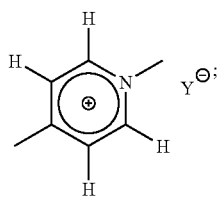

and Y is Br.

In certain embodiments, the present invention relates to any of the aforementioned methods, wherein m is 0.

In certain embodiments, the present invention relates to any of the aforementioned methods, wherein m is 1.

In certain embodiments, the present invention relates to any of the aforementioned methods, wherein m is 1.

In certain embodiments, the present invention relates to any of the aforementioned methods, wherein m is 2.

In certain embodiments, the present invention relates to any of the aforementioned methods, wherein m is 3.

In certain embodiments, the present invention relates to any of the aforementioned methods, wherein m is 4.

In certain embodiments, the present invention relates to any of the aforementioned methods, wherein m is 5.

In certain embodiments, the present invention relates to any of the aforementioned methods, wherein $R^1$ is hydrogen.

In certain embodiments, the present invention relates to any of the aforementioned methods, wherein $R^3$ is aryl.

In certain embodiments, the present invention relates to any of the aforementioned methods, wherein $R^3$ is phenyl.

In certain embodiments, the present invention relates to any of the aforementioned methods, wherein X is —C(=N—OH)—$R^3$; and $R^2$ is hydrogen.

In certain embodiments, the present invention relates to any of the aforementioned methods, wherein X is —C(=N—OH)—$R^3$; $R^2$ is hydrogen; and $R^1$ is hydrogen.

In certain embodiments, the present invention relates to any of the aforementioned methods, wherein X is —C(=N—OH)—$R^3$; $R^2$ is hydrogen; $R^1$ is hydrogen; and n is 0.

In certain embodiments, the present invention relates to any of the aforementioned methods, wherein X is —C(=N—OH)—$R^3$; $R^2$ is hydrogen; $R^1$ is hydrogen; n is 0; and m is 1.

In certain embodiments, the present invention relates to any of the aforementioned methods, wherein X is —C(=N—OH)—$R^3$; $R^2$ is hydrogen; $R^1$ is hydrogen; n is 0; m is 1; and $R^3$ is phenyl.

In certain embodiments, the present invention relates to any of the aforementioned methods, wherein X is —C(=N—OH)—$R^3$; $R^2$ is hydrogen; $R^1$ is hydrogen; n is 0; m is 1; $R^3$ is phenyl; W is

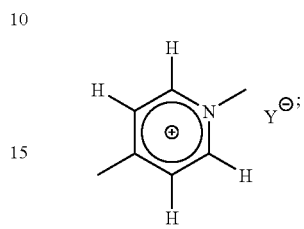

and Y is Br.

Another aspect of the present invention relates to a method for the hydrolysis of a compound which contains at least one oxidized phosphorus group, the method comprising the step of contacting said compound with at least one particle having a diameter for a time period sufficient to hydrolyze at least some of the oxidized phosphorus groups in said compound; wherein said particle comprises an inorganic metal oxide and a stabilizing compound, said stabilizing compound comprises a nucleophilic moiety; wherein said nucleophilic moiety is selected from the group consisting of alpha-nucleophiles, heteroatom-containing resonance-stabilized nucleophiles and n-nucleophiles; and said diameter is about 1 to about 1,000 nm.

In certain embodiments, the present invention relates to any of the aforementioned methods, wherein said nucleophilic moiety is selected from the group consisting of oximes, hydroxamic acids, enamines, aryloxides, and heteroaryloxides.

In certain embodiments, the present invention relates to any of the aforementioned methods, wherein said nucleophilic moiety is selected from the group consisting of oximes, hydroxamic acids, hydrazines, hydrazones, and sulfoxides.

In certain embodiments, the present invention relates to any of the aforementioned methods, wherein said nucleophilic moiety is selected from the group consisting of oximes and hydroxamic acids.

Another aspect of the present invention relates to a method for the hydrolysis of a compound which contains at least one oxidized phosphorus group, the method comprising the step of contacting said compound with at least one particle having a diameter for a time period sufficient to hydrolyze at least some of the oxidized phosphorus groups in said compound; wherein said particle comprises an inorganic metal oxide and a stabilizing compound, said stabilizing compound comprises a nucleophilic moiety; wherein said diameter is about 1 to about 1,000 nm; and said stabilizing compound comprising a nucleophilic moiety is represented by compound I or II:

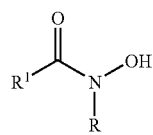

I

-continued

II

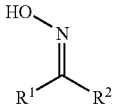

wherein, independently for each occurrence,

R is —C(=O)OR³, —C(=O)N(R³)₂, —C(=O)SR³, —C(=O)R³, —C(=NR)R³, —C(=S)R³, —C(R³)=C(R³)₂, —C≡CR³, —C≡N, —[C(R³)₂]ₚ—R³, hydrogen, alkyl, cycloalkyl, heterocycloalkyl, cycloalkenyl, heterocycloalkenyl, aryl, or heteroaryl;

R¹ is —OR, —NR₂, —SR, —C(=O)OR, —OC(=O)R, —NRC(=O)R, —C(=O)NR₂, —C(=O)SR, —SC(=O)R, —S(=O)R, —S(=O)₂R, —C(=O)R³, —C(=NR)R³, —C(=S)R³, —C(R³)=C(R³)₂, —C≡CR³, —C≡N, —[C(R³)₂]ₚ—R, hydrogen, alkyl, cycloalkyl, heterocycloalkyl, cycloalkenyl, heterocycloalkenyl, aryl, or heteroaryl;

R² is —OR, —NR₂, —SR, —C(=O)OR, —OC(=O)R, —NRC(=O)R, —C(=O)NR₂, —C(=O)SR, —SC(=O)R, —S(=O)R, —S(=O)₂R, —C(=O)R³, —C(=NR)R³, —C(=S)R³, —C(R³)=CR³)₂, —C≡CR³, —C≡N, —[C(R³)₂]ₚ—R, hydrogen, halogen, alkyl, cycloalkyl, heterocycloalkyl, cycloalkenyl, heterocycloalkenyl, aryl, or heteroaryl;

R³ is hydrogen, halogen, alkyl, cycloalkyl, heterocycloalkyl, alkenyl, cycloalkenyl, heterocycloalkenyl, alkynyl, cyano, aryl, or heteroaryl;

n is 0-10 inclusive; and p is 0-10 inclusive.

In certain embodiments, the present invention relates to any of the aforementioned methods, wherein said stabilizing compound comprising a nucleophilic moiety is represented by compound I.

In certain embodiments, the present invention relates to any of the aforementioned methods, wherein said stabilizing compound comprising a nucleophilic moiety is represented by compound II.

In certain embodiments, the present invention relates to any of the aforementioned methods, wherein said stabilizing compound comprising a nucleophilic moiety is represented by compound III, IV, V or VI:

III

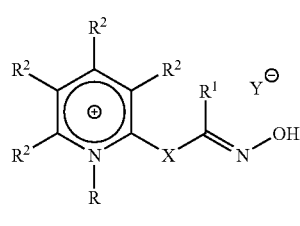

IV

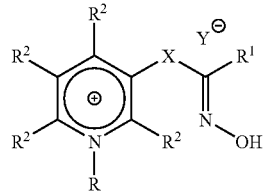

V

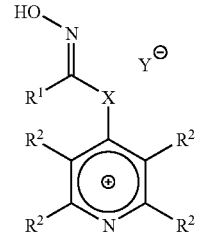

VI

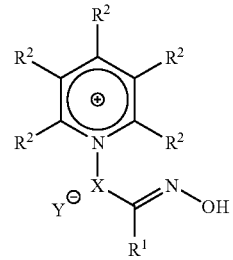

wherein, independently for each occurrence,

X is —[C(R³)₂]ₙ—;

Y is Br, Cl, I, OMs, or OTf;

R is —C(=O)OR³—C(=O)N(R³)₂, —C(=O)SR³, —C(=O)R³, —C(=NR³)R³, —C(=S)R³, —C(R³)=C(R³)₂, —C≡CR³, —[C(R³)₂]ₚ—R³, hydrogen, alkyl, cycloalkyl, heterocycloalkyl, cycloalkenyl, heterocycloalkenyl, aryl, or heteroaryl;

R¹ is hydrogen, alkyl, cycloalkyl, heterocycloalkyl, cycloalkenyl, heterocycloalkenyl, aryl, or heteroaryl;

R² is —OR, —NR₂, —SR, —C(=O)OR, —OC(=O)R, —NRC(=O)R, —C(=O)NR₂, —C(=O)SR, —SC(=O)R, —S(=O)R, —S(=O)₂R, —C(=O)R³, —C(=NR)R³, —C(=S)R³, —C(R³)=C(R³)₂, —C≡CR³, —C≡N, —[C(R³)₂]ₚ—R, hydrogen, halogen, alkyl, cycloalkyl, heterocycloalkyl, cycloalkenyl, heterocycloalkenyl, aryl, or heteroaryl;

R³ is hydrogen, halogen, alkyl, cycloalkyl, heterocycloalkyl, alkenyl, cycloalkenyl, heterocycloalkenyl, alkynyl, cyano, aryl, or heteroaryl;

n is 0-10 inclusive; and p is 0-10 inclusive.

In certain embodiments, the present invention relates to any of the aforementioned methods, wherein said stabilizing compound comprising a nucleophilic moiety is represented by compound III.

In certain embodiments, the present invention relates to any of the aforementioned methods, wherein said stabilizing compound comprising a nucleophilic moiety is represented by compound IV.

In certain embodiments, the present invention relates to any of the aforementioned methods, wherein said stabilizing compound comprising a nucleophilic moiety is represented by compound V.

In certain embodiments, the present invention relates to any of the aforementioned methods, wherein said stabilizing compound comprising a nucleophilic moiety is represented by compound VI.

In certain embodiments, the present invention relates to any of the aforementioned methods, wherein n is 0.

In certain embodiments, the present invention relates to any of the aforementioned methods, wherein n is 1.

In certain embodiments, the present invention relates to any of the aforementioned methods, wherein n is 2-10 inclusive.

In certain embodiments, the present invention relates to any of the aforementioned methods, wherein n is 3-10 inclusive.

In certain embodiments, the present invention relates to any of the aforementioned methods, wherein n is 4-10 inclusive.

In certain embodiments, the present invention relates to any of the aforementioned methods, wherein n is 5-10 inclusive.

In certain embodiments, the present invention relates to any of the aforementioned methods, wherein Y is Br or I.

In certain embodiments, the present invention relates to any of the aforementioned methods, wherein R is alkyl.

In certain embodiments, the present invention relates to any of the aforementioned methods, wherein $R^1$ is aryl.

In certain embodiments, the present invention relates to any of the aforementioned methods, wherein $R^2$ is hydrogen.

In certain embodiments, the present invention relates to any of the aforementioned methods, wherein n is 0; and Y is Br or I.

In certain embodiments, the present invention relates to any of the aforementioned methods, wherein n is 0; Y is Br or I; and $R^2$ is hydrogen.

In certain embodiments, the present invention relates to any of the aforementioned methods, wherein n is 0; Y is Br or I; $R^2$ is hydrogen; and R is alkyl.

In certain embodiments, the present invention relates to any of the aforementioned methods, wherein n is 0; Y is Br or I; $R^2$ is hydrogen; and $R^1$ is aryl.

In certain embodiments, the present invention relates to any of the aforementioned methods, wherein n is 0; Y is Br or I; $R^2$ is hydrogen; R is alkyl; and $R^1$ is aryl.

In certain embodiments, the present invention relates to any of the aforementioned methods, wherein n is 0; X is Br; R is methyl; $R^1$ is phenyl; and $R^2$ is hydrogen.

Another aspect of the present invention relates to a method for the hydrolysis of a compound which contains at least one oxidized phosphorus group, the method comprising the step of contacting said compound with at least one particle having a diameter for a time period sufficient to hydrolyze at least some of the oxidized phosphorus groups in said compound; wherein said particle comprises an inorganic metal oxide and a stabilizing compound, said stabilizing compound comprises a nucleophilic moiety; wherein said diameter is about 1 to about 1,000 nm; and said stabilizing compound comprising a nucleophilic moiety is a polymer or copolymer; wherein said polymer or co-polymer comprises a plurality of monomers represented by formula X:

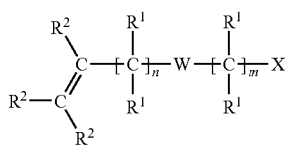

wherein, independently for each occurrence,

X is —C(=N—OH)—$R^3$ or —C(=O)—N(R)—OH;
W is absent, —O—, —N(R)—, —S—, —C(=O)O—, —C(=O)N(R)—, —C(=O)S—, —S(=O)—, —S(=O)$_2$—, —C($R^3$)$_2$—, —C(=O)—, —C(=N$R^3$)—, —C(=S)—, —C($R^3$)=C($R^3$)—, —C≡C—, -cycloalkyl-, -heterocycloalkyl-, -cycloalkenyl-, -heterocycloalkenyl-, -aryl-, or -heteroaryl-;

R is —C(=O)O$R^3$, —C(=O)N($R^3$)$_2$, —C(=O)S$R^3$, —C(=O)$R^3$, —C(=N$R^3$)$R^3$, —C(=S)$R^3$, —C($R^3$)=C($R^3$)$_2$, —C≡C$R^3$, —[C($R^3$)$_2$]$_p$—$R^3$, hydrogen, alkyl, cycloalkyl, heterocycloalkyl, cycloalkenyl, heterocycloalkenyl, aryl, or heteroaryl;

$R^1$ is —OR, —N$R^2$, —SR, —C(=O)OR, —OC(=O)R, —NRC(=O)R, —C(=O)N$R_2$, —C(=O)SR, —SC(=O)R, —S(=O)R, —S(=O)$_2$R, —C(=O)$R^3$, —C(=N$R^3$)$R^3$, —C(=S)$R^3$, —C($R^3$)=C$^3$)$_2$, —C≡C$R^3$, —C≡N, —[C($R^3$)$_2$]$_n$—R, hydrogen, alkyl, cycloalkyl, heterocycloalkyl, cycloalkenyl, heterocycloalkenyl, aryl, or heteroaryl;

$R^2$ is hydrogen, halogen, alkyl, cycloalkyl, heterocycloalkyl, alkenyl, cycloalkenyl, heterocycloalkenyl, alkynyl, cyano, aryl, heteroaryl or —[C($R^3$)$_2$]$_p$—R;

$R^3$ is hydrogen, halogen, alkyl, cycloalkyl, heterocycloalkyl, alkenyl, cycloalkenyl, heterocycloalkenyl, alkynyl, cyano, aryl, or heteroaryl; and n is 0-5 inclusive;

m is 0-5 inclusive; and p is 0-10 inclusive.

In certain embodiments, the present invention relates to any of the aforementioned methods, wherein X is —C(=N—OH)—$R^3$.

In certain embodiments, the present invention relates to any of the aforementioned methods, wherein X is —C(=O)—N(R)—OH.

In certain embodiments, the present invention relates to any of the aforementioned methods, wherein $R^2$ is hydrogen or alkyl.

In certain embodiments, the present invention relates to any of the aforementioned methods, wherein $R^2$ is hydrogen.

In certain embodiments, the present invention relates to any of the aforementioned methods, wherein n is 0.

In certain embodiments, the present invention relates to any of the aforementioned methods, wherein n is 1.

In certain embodiments, the present invention relates to any of the aforementioned methods, wherein n is 2.

In certain embodiments, the present invention relates to any of the aforementioned methods, wherein n is 3.

In certain embodiments, the present invention relates to any of the aforementioned methods, wherein n is 4.

In certain embodiments, the present invention relates to any of the aforementioned methods, wherein n is 5.

In certain embodiments, the present invention relates to any of the aforementioned methods, wherein W is -heteroaryl-.

In certain embodiments, the present invention relates to any of the aforementioned methods, wherein W is

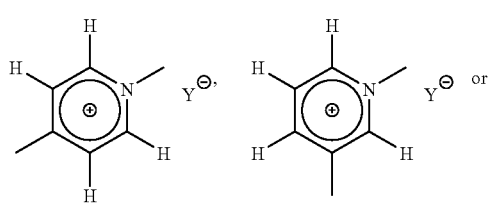

-continued

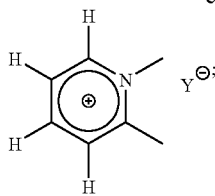

and Y is Br, Cl, I, OMs, or OTf.

In certain embodiments, the present invention relates to any of the aforementioned methods, wherein W is

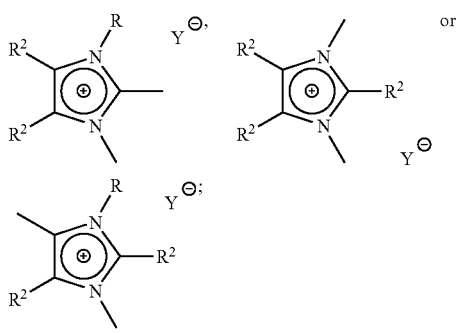

and Y is Br, Cl, I, OMs, or OTf.

In certain embodiments, the present invention relates to any of the aforementioned methods, wherein W is

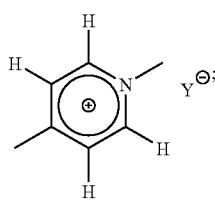

and Y is Br.

In certain embodiments, the present invention relates to any of the aforementioned methods, wherein W is

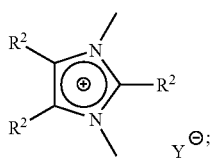

and Y is Br.

In certain embodiments, the present invention relates to any of the aforementioned methods, wherein m is 0.

In certain embodiments, the present invention relates to any of the aforementioned methods, wherein m is 1.

In certain embodiments, the present invention relates to any of the aforementioned methods, wherein m is 1.

In certain embodiments, the present invention relates to any of the aforementioned methods, wherein m is 2.

In certain embodiments, the present invention relates to any of the aforementioned methods, wherein m is 3.

In certain embodiments, the present invention relates to any of the aforementioned methods, wherein m is 4.

In certain embodiments, the present invention relates to any of the aforementioned methods, wherein m is 5.

In certain embodiments, the present invention relates to any of the aforementioned methods, wherein $R^1$ is hydrogen.

In certain embodiments, the present invention relates to any of the aforementioned methods, wherein $R^3$ is aryl.

In certain embodiments, the present invention relates to any of the aforementioned methods, wherein $R^3$ is phenyl.

In certain embodiments, the present invention relates to any of the aforementioned methods, wherein X is —C(=N—OH)—$R^3$; and $R^2$ is hydrogen.

In certain embodiments, the present invention relates to any of the aforementioned methods, wherein X is —C(=N—OH)—$R^3$; $R^2$ is hydrogen; and $R^1$ is hydrogen.

In certain embodiments, the present invention relates to any of the aforementioned methods, wherein X is —C(=N—OH)—$R^3$; $R^2$ is hydrogen; $R^1$ is hydrogen; and n is 0.

In certain embodiments, the present invention relates to any of the aforementioned methods, wherein X is —C(=N—OH)—$R^3$; $R^2$ is hydrogen; $R^1$ is hydrogen; n is 0; and m is 1.

In certain embodiments, the present invention relates to any of the aforementioned methods, wherein X is —C(=N—OH)—$R^3$; $R^2$ is hydrogen; $R^1$ is hydrogen; n is 0; m is 1; and $R^3$ is phenyl.

In certain embodiments, the present invention relates to any of the aforementioned methods, wherein X is —C(=N—OH)—$R^3$; $R^2$ is hydrogen; $R^1$ is hydrogen; n is 0; m is 1; $R^3$ is phenyl; W is

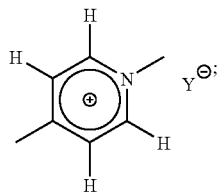

and Y is Br.

In certain embodiments, the present invention relates to any of the aforementioned methods, wherein said particle is capable of adsorbing said compound and said contacting step is carried out for a time period sufficient to also permit adsorption of at least some of said compound onto the particle.

In certain embodiments, the present invention relates to any of the aforementioned methods, wherein said compound is selected from the group consisting of parathion, malathion, diazinon, phosmet (Imidan®), chlorpyrifos (Lorsban®), sarin, tabun (ethylphosphorodimethyl-amidocyanidate), soman (plnacolyl methylphospphonerfluoridate), GF (Cyclohexyl methylphosphonofluoridate), VX (ethyl S-2-diisopropyl aminoethyl methylphosphoro-thioate) or diisopropyl fluorophosphate (DFP).

In certain embodiments, the present invention relates to any of the aforementioned methods, wherein said effective particle size is about 1 to about 500 nm.

In certain embodiments, the present invention relates to any of the aforementioned methods, wherein said effective particle size is about 1 to about 250 nm.

In certain embodiments, the present invention relates to any of the aforementioned methods, wherein said effective particle size is about 1 to about 100 nm.

In certain embodiments, the present invention relates to any of the aforementioned methods, wherein said effective particle size is about 5 to about 50 nm.

In certain embodiments, the present invention relates to any of the aforementioned methods, wherein said effective particle size is about 10 to about 25 nm.

In certain embodiments, the present invention relates to any of the aforementioned methods, wherein said inorganic metal oxide comprises at least one metal selected from the group consisting of Fe, Ru, Os, Co, Rh, Ir, Ni, Pd, Pt, Cu, Zn and Ni.

In certain embodiments, the present invention relates to any of the aforementioned methods, wherein said inorganic metal oxide comprises at least one metal selected from the group consisting of Fe, Cu, Zn and Ni.

In certain embodiments, the present invention relates to any of the aforementioned methods, wherein said inorganic metal oxide is an iron oxide.

In certain embodiments, the present invention relates to any of the aforementioned methods, wherein said inorganic metal oxide is $Fe_2O_3$ or $Fe_3O_4$.

In certain embodiments, the present invention relates to any of the aforementioned methods, wherein said inorganic metal oxide is $Fe_3O_4$.

In certain embodiments, the present invention relates to any of the aforementioned methods, wherein said composition is superparamagnetic.

EXEMPLIFICATION

The invention now being generally described, it will be more readily understood by reference to the following examples, which are included merely for purposes of illustration of certain aspects and embodiments of the present invention, and are not intended to limit the invention.

EXAMPLE 1

Materials Used

Iron (II) chloride tetrahydrate (99%), iron (III) chloride hexahydrate (98%), acrylic acid (99%), 4-vinylpyridine (95%), 2-bromoacetophenone (98%), 2-pyridinealdoxime methiodide (PAM, 99%), diisopropyl fluorophosphate (DFP, 99%), and 2,2'-azobisisobutyronitryile (AIBN, 98%) were purchased from Sigma-Aldrich Chemical Co. (St. Louis, Mo.) and used as received. All other chemicals, solvents, and gases were obtained from commercial sources and were of highest purity available.

EXAMPLE 2

Polymer Synthesis

Copolymer of acrylic acid (AA) and 4-vinyl pyridine (4-VP) was synthesized by free-radical copolymerization using AIBN as an initiator. A vial containing a solution of 0.1 mol (10 mL) of 4-VP, 0.1 mol (6.9 mL) of AA, and 0.2 g of AIBN in N,N-dimethylformamide (10 mL) was deaerated by nitrogen purge, sealed, and kept at 70° C. overnight. The resulting viscous copolymer [p(VP-AA)] solution was repeatedly washed by acetone and methanol and precipitated by hexane followed by drying under vacuum, dissolution in deionized water and exhaustive dialysis (membrane MWCO, 3.5 kDa) against DI water. The purified p(VP-AA) samples were lyophilized and stored dry at 2-8° C. until further use. $(C_{12}H_{17}NO_2)_x$, found (calc): C 69.26 (69.54); H 8.29 (8.27); N 7.74 (6.76). $^1$H NMR (400 MHz, $CD_3OD$): δ 1.7 (m, 2H, $CH_2$— in the main chain), 2.7 (m, 1H, CH— in the main chain), 7.2 (m, 3H, pyridine), 8.45 (m, 2 H, pyridine). Weight average MW by GPC 63 kDa, polydispersity index 1.9.

Figure 2:
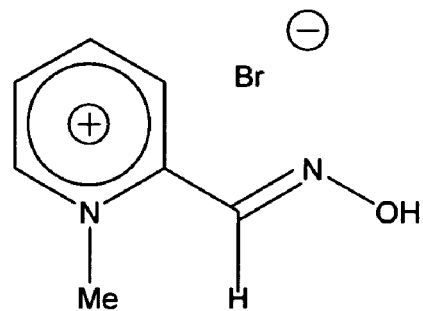
FIG. 2 depicts the chemical structures of certain oxime-containing species employed for magnetite particle modification described herein: [A] 2-pralidoxime bromide and [B] poly(4-vinylpyridine-N-phenacyloxime-co-acrylic acid) [p(VPOX-AA)], where m, n and p are integers.
Figure 2:
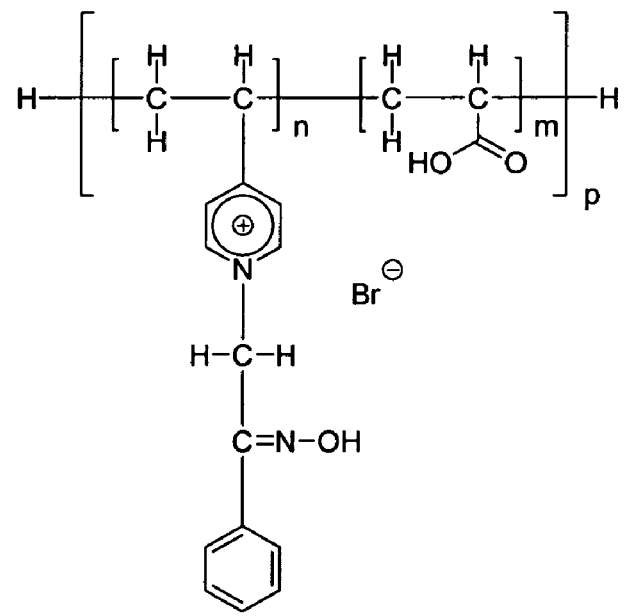

The p(VP-AA) was further modified to yield its oximated analog, abbreviated p(VPOx-AA) (FIG. 2). A solution of p(VP-AA) copolymer (3.75 g, 18 mmol) and 4.0 g (19 mmol) of 2-bromoacetophenone in 150 mL of absolute ethanol was refluxed in a round-bottom flask at 70° C. under stirring for 48 h. Then the solvent was vacuum-evaporated and the contents of the flask were resuspended in 150 mL of anhydrous methanol. After addition of hydroxylamine hydrochloride (2.5 g, 36 mmol) and sodium hydroxide (1.4 g, 36 mmol), the resulting suspension was kept at 70° C. under reflux while stirring for 48 h. Then the solvent was evaporated and the contents of the flask were repeatedly washed by diethyl ether on a filter and dried. The residual solids were dissolved in 100 mL of 15% aqueous ethanol and the solution was dialyzed against 50% aqueous ethanol followed by exhaustive dialysis against deionized water (membrane MWCO, 3.5 kDa). The resulting copolymer was freeze-dried and stored at −20° C. $(C_{20}H_{25}N_2O_3)_x$, found (calc): C 69.64 (70.36); H 7.17 (7.38); N 7.95 (8.20). $^1$H NMR (400 MHz, $CD_3OD$): δ 1.75 (m, 2H, $CH_2$— in the main chain), 2.38, 3.28 (m, 1H, CH— in the main chain), 6.7, 7.0, 7.3 (m, 6H, benzyl), 8.3 (m, 5H, pyridine).

EXAMPLE 3

Particle Synthesis

Magnetic nanoparticles were produced by chemical coprecipitation of iron(II) and iron(III) chlorides. Namely, 1.88 g (7.0 mmol) of $FeCl_3.6H_2O$ and 0.69 g (3.5 mmol) of $FeCl_2.4H_2O$ were added to 40 mL of deionized water and the solution was deaerated by nitrogen purge in a stirred 250-mL three-necked flask and temperature of the flask contents was brought to 80° C. Then an aqueous solution of a stabilizing compound (2.6 to 2.8 g compound in 40 mL water, pH adjusted to 6) was added to the flask and the resulting mixture was equilibrated at 80° C. while stirring under nitrogen purge. Then the nitrogen purge was ceased and the contents of the flask were at once added to 80 mL of a 28% ammonium hydroxide and the mixture that rapidly turned black was vigorously stirred for 5-10 min. The resulting precipitate possessed strong magnetic properties and was thus separated from the liquid by decantation using a Franz Isodynamic Magnetic Separator (Trenton, N.J.). The precipitate was then dried in an oven at 60° C. until constant weight, resuspended in deionized water by sonication for 30 s with a Branson sonifier 450 at an output of 40%, and the suspension was dialyzed against excess deionized water (membrane MW cutoff, 3.5 kDa) and lyophilized. The contents of thus obtained oxime-containing particles were assessed by elemental analysis and are collected in Table 2.

TABLE 2

Elemental Analysis of Oxime-Containing Particles

| Abbreviation | Stabilizing compound | Elemental analysis | Oxime group contents, mmol/g |
|---|---|---|---|
| PAM/M | PAM | $[C_7H_9N_2O(Fe_3O_4)_2]_x$, found (calc): C 13.43 (14.01); H 1.66 (1.51); Fe 54.80 (55.82); N 3.97 (4.67). | 1.7 |

TABLE 2-continued

Elemental Analysis of Oxime-Containing Particles

| Abbreviation | Stabilizing compound | Elemental analysis | Oxime group contents, mmol/g |
|---|---|---|---|
| p(VPOx-AA)/M | P(VPOx-AA) copolymer | [$C_{38}H_{44}N_4O_6(Fe_3O_4)_3$]$_x$, found (calc): C 33.34 (33.87); H 3.48 (3.29); Fe 37.38 (37.30); N 5.16 (4.16). | 1.5 |

EXAMPLE 4

Particle Characterization

Dynamic light scattering (DLS) experiments were performed with a Brookhaven BI-200SM light scattering system at a measurement angle of 90°. Volume-average particle size distributions were obtained using the built-in software and the reported particle hydrodynamic diameters are the average of five measurements. All samples were filtered with a 0.45 μm syringe filter prior to the DLS tests.

Superconducting Quantum Interference Device (SQUID) experiments were conducted using a Model 32 kG Gaussmeter (Digital Measurement Systems) to determine the magnetization of the particles in an applied magnetic field. Particle suspensions weighing 40-80 mg were placed in an airtight sample cell, and the exact mass of the samples was determined following the SQUID measurement. All SQUID measurements were performed at 300 K over a −1 to +1 T range.

EXAMPLE 5

Kinetic Measurements

Kinetics of the DFP decomposition were measured at 25° C. with an Orion 96-09 combination fluoride electrode (Thermo Electron Corp., Beverly, Mass.) and a Model 45 Dual Display Multimeter (Fluke Corp., Everett, Wash.) connected to a PC with a FlukeView Forms software for data processing. The electrode potential-time output was continuously recorded and each datapoint represents an average of the voltage amplitude within one-second interval. The electrode was immersed in a 9-mL aqueous sample and the output was allowed to equilibrate for about 10 min. A known volume of DFP was added into the sample at once via a Precision Sampling syringe (Valco Instruments Co. Inc, Houston, Tex.) and the time commenced. Samples containing no particles were stirred by a small magnetic bar, whereas suspensions with particles sized at or above 100 nm were stirred using nitrogen bubbling. No particle sedimentation or precipitation was observed in all experiments. The pH was measured in each sample upon completion of the kinetics measurement. No significant changes in pH set at 7.0 were observed in all cases. The electrode was calibrated in independent series of experiments using aqueous solutions of sodium fluoride with or without magnetic particles suspended at various concentrations.

EXAMPLE 6

Magnetic Separation and Reuse

High-gradient magnetic separation (HGMS) experiments were performed with a permanent magnet system as follows. The HGMS system consisted of a cylindrical glass column with an internal diameter of 7 mm and a length of 22 cm (a volume of 8.46 mL) that was packed with 3.6 g of type 430 fine-grade stainless steel wool (40-66 μm diameter) supplied by S. G. Frantz Co., Inc. (Trenton, N.J.). For filtration, the column was placed inside of a quadrupole magnet system comprising four nickel-plated Neodymium Iron Boron 40 MGOe permanent magnets sized 18×1.8×1.8 cm each (Dura Magnetics, Inc., Sylvania, Ohio). The flux density generated inside of the packed column was ca. 0.73 Tesla.

Magnetic washing of the particles was performed by passing 9 mL of a sample that initially contained 1 mg/mL particles suspended in 10 mM Tris and than allowed to equilibrate with 4.0 mM DFP solution through the column placed inside of the magnet system. The liquid was pumped through the column at 1.5 mL/min with a peristaltic pump. Then the column was removed from the magnet, and 18 mL of deionized water (pH adjusted to 7.0) was passed through the column to collect the washed particles. Several washed samples underwent the recovery process to collect sufficient amount of particles for reuse. The particle suspension was evaporated to dryness at 50° C. and the residual solid was weighed and re-suspended in 10 mM Tris buffer by sonication to result in effective solid concentration of 1 mg/mL. The resulting suspension was subjected to the kinetic experiment using electrode detection of the fluoride ions generated by the DFL decomposition. The process of the particles recovery and reuse was repeated in two sequential cycles.

INCORPORATION BY REFERENCE

All of the U.S. patents and U.S. patent application publications cited herein are hereby incorporated by reference.

EQUIVALENTS

Those skilled in the art will recognize, or be able to ascertain using no more than routine experimentation, many equivalents to the specific embodiments of the invention described herein. Such equivalents are intended to be encompassed by the following claims.

We claim:

1. A particle having a diameter, comprising an inorganic metal oxide and a stabilizing compound comprising a nucleophilic moiety; wherein said diameter is about 1 to about 1,000 nm; and said stabilizing compound comprising a nucleophilic moiety is a polymer or co-polymer; wherein said polymer or co-polymer comprises a plurality of monomers represented by formula X:

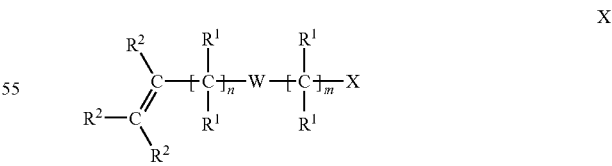

wherein, independently for each occurrence,
X is —C(=N—OH)—$R^3$ or —C(=O)—N(R)—OH;
W is absent, —O—, —N(R)—, —S—, —C(=O)O—, —C(=O)N(R)—, —C(=O)S—, —S(=O)—, —S(=O)$_2$—, —C($R^3$)$_2$—, —C(=O)—, —C(=N$R^3$)—, —C(=S)—, —C($R^3$)=C($R^3$)—, —C≡C—, -cycloalkyl-, -heterocycloalkyl-, -cycloalkenyl-, -heterocycloalkenyl-, -aryl-, or -heteroaryl-;

R is —C(=O)OR³, —C(=O)N(R³)₂, —C(=O)SR³, —C(=O)R³, C(=NR³)R³, —C(=S)R³, —C(R³)=C(R³)₂, —C≡CR³, —[C(R³)₂]ₚ—R³, hydrogen, alkyl, cycloalkyl, heterocycloalkyl, cycloalkenyl, heterocycloalkenyl, aryl, or heteroaryl;

R¹ is —OR, —NR₂, —SR, —C(=O)OR, —OC(=O)R, —NRC(=O)R, —C(=O)NR₂, —C(=O)SR, —SC(=O)R, —S(=O)R, —S(=O)₂R, —C(=O)R³, —C(=NR)R³, —C(=S)R³, —C(R³)=C(R³)₂, —C≡C R³, —C≡N, —[C(R³)₂]ₚ—R, hydrogen, alkyl, cycloalkyl, heterocycloalkyl, cycloalkenyl, heterocycloalkenyl, aryl, or heteroaryl;

R² is hydrogen or alkyl;

R³ is hydrogen, halogen, alkyl, cycloalkyl, heterocycloalkyl, alkenyl, cycloalkenyl, heterocycloalkenyl, alkynyl, cyano, aryl, or heteroaryl; and n is 0-5 inclusive;

m is 0-5 inclusive; and p is 0-10 inclusive.

2. The particle of claim 1, wherein X is —C(=N—OH)—R.

3. The particle of claim 1, wherein n is 0.

4. The particle of claim 1, wherein W is -heteroaryl-.

5. The particle of claim 1, wherein W is

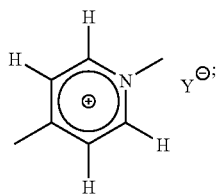

and Y is Br.

6. The particle of claim 1, wherein m is 1.

7. The particle of claim 1, wherein R¹ is hydrogen.

8. The particle of claim 1, wherein R³ is aryl.

9. The particle of claim 1, wherein X is —C(=N—OH)—R³; R² is hydrogen; R¹ is hydrogen; n is 0; m is 1; R³ is phenyl; W is

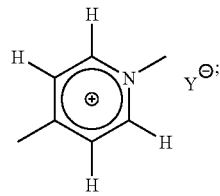

and Y is Br.

10. The particle of claim 1, wherein said inorganic metal oxide comprises at least one metal selected from the group consisting of Fe, Cu, Zn and Ni.

11. The particle of claim 1, wherein said inorganic metal oxide is an iron oxide.

12. The particle of claim 1, wherein said inorganic metal oxide is $Fe_3O_4$.

13. The particle of claim 1, wherein said composition is superparamagnetic.

14. The particle of claim 1, wherein said diameter is about 1 nm to about 500 nm.

15. The particle of claim 1, wherein said diameter is about 1 nm to about 250 nm.

16. The particle of claim 1, wherein said diameter is about 1 nm to about 100 nm.

17. The particle of claim 1, wherein two instances of R² in a monomer are H; and one instance of R² in a monomer is alkyl.

18. The particle of claim 1, wherein two instances of R² in a monomer are H; and one instance of R² in a monomer is methyl.

19. The particle of claim 1, wherein R² is H.

* * * * *

UNITED STATES PATENT AND TRADEMARK OFFICE
CERTIFICATE OF CORRECTION

PATENT NO.     : 7,598,199 B2
APPLICATION NO. : 11/126064
DATED          : October 6, 2009
INVENTOR(S)    : Hatton et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1083 days.

Signed and Sealed this

Twenty-eighth Day of September, 2010

David J. Kappos
*Director of the United States Patent and Trademark Office*